US012741754B2

(12) United States Patent
Vahlberg et al.

(10) Patent No.: US 12,741,754 B2

(45) Date of Patent: Sep. 22, 2026

(54) SYSTEMS AND METHODS FOR TESTING FLIGHT CONTROL SURFACE ACTUATORS OF AERIAL REFUELING BOOMS

(71) Applicant: The Boeing Company, Arlington, VA (US)

(72) Inventors: Rick G. Vahlberg, Burien, WA (US); Sreekumar Thampi, Friendswood, TX (US); Carl Beck, Kent, WA (US); Alden R. Olmstead, Burien, WA (US); Lauren S. Poscablo, Tukwila, WA (US)

(73) Assignee: The Boeing Company, Arlington, VA (US)

(*) Notice: Subject to any disclaimer, the term of this patent is extended or adjusted under 35 U.S.C. 154(b) by 0 days.

(21) Appl. No.: 18/967,958

(22) Filed: Dec. 4, 2024

(65) Prior Publication Data

US 2026/0159252 A1 Jun. 11, 2026

(51) Int. Cl.

*B64F 5/60* (2017.01)
*B64D 39/00* (2006.01)
*B64F 5/50* (2017.01)

(52) U.S. Cl.

CPC ................ *B64F 5/60* (2017.01); *B64D 39/00* (2013.01); *B64F 5/50* (2017.01)

(58) Field of Classification Search

CPC ............... B64F 5/60; B64F 5/50; B64D 39/00
See application file for complete search history.

(56) References Cited

U.S. PATENT DOCUMENTS 10,787,279 B2 9/2020 Moulon et al.
11,479,371 B1 10/2022 Perry
11,526,636 B2 12/2022 Tessier et al.

OTHER PUBLICATIONS

Understanding the Significance of Refueling System Hydraulics (Year: 2024).*
Moog Selected to Provide Actuation System for Boeing Next-Generation KC-46 Tanker (Year: 2011).*

* cited by examiner

*Primary Examiner* — Aryan E Weisenfeld
(74) *Attorney, Agent, or Firm* — Walters & Wasylyna LLC

(57) ABSTRACT

A system for testing control surface actuators of an aerial refueling boom includes a rudder test apparatus and an elevator test apparatus. The rudder test apparatus is configured to be coupled to at least one of a first rudder and second rudder. The elevator test apparatus is configured to be coupled to at least one of a first elevator and second elevator. With the rudder test apparatus coupled to at least one of the first rudder and second rudder, a constant rudder test force applied to the rudder test apparatus drives actuation of one of the first rudder or second rudder against a rudder actuator. With the elevator test apparatus coupled to at least one of the first elevator and second elevator, a constant elevator test force applied to the elevator test apparatus drives actuation of the first elevator and second elevator against an elevator actuator.

20 Claims, 15 Drawing Sheets

344
122
178
322
324
124
114
108
108
306
110
108
108
176
112
142
300
312
314
178
342

312
314
104
114
146
148
306
300
324
124
322

344
322
122
144
324
300
364
110
102
124
164
306
152
106
192
332
114
314
312
112
342
362
154

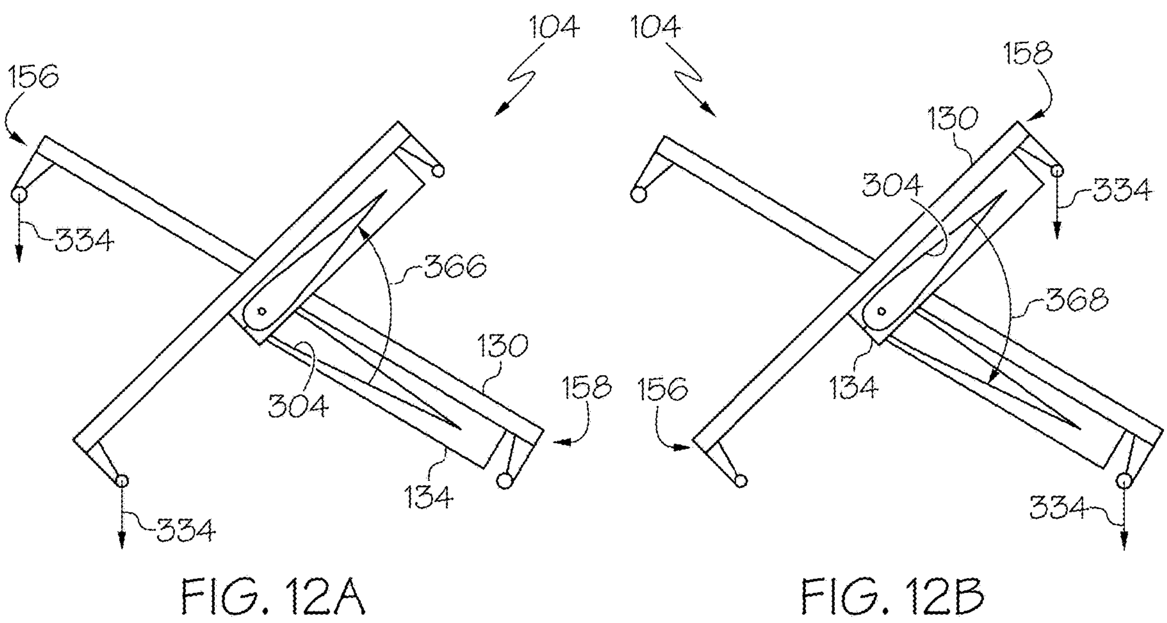
FIG. 12A
FIG. 12B
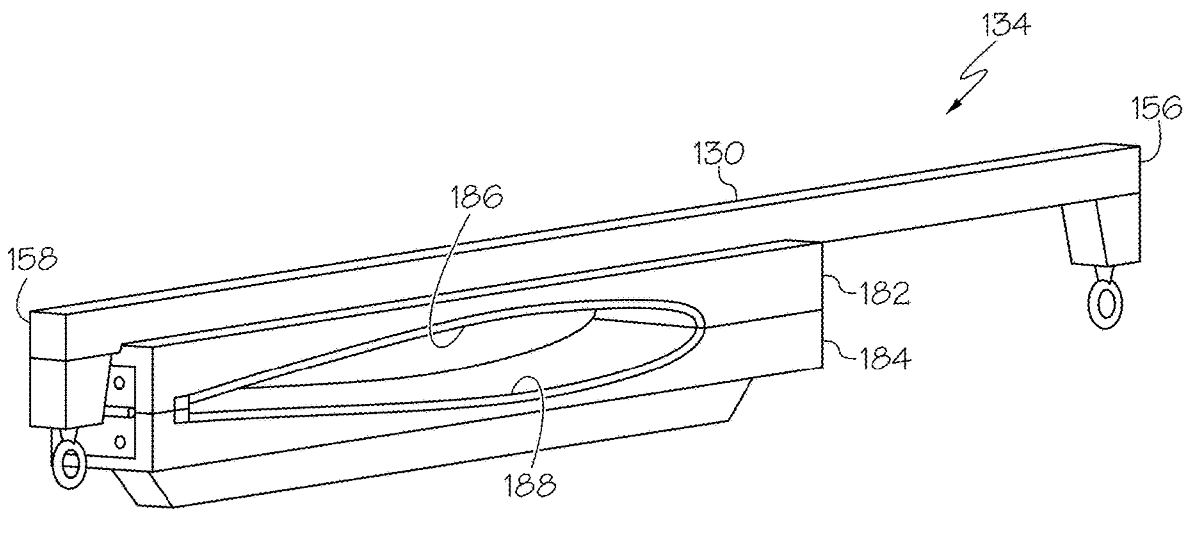
FIG. 13

SYSTEMS AND METHODS FOR TESTING FLIGHT CONTROL SURFACE ACTUATORS OF AERIAL REFUELING BOOMS

FIELD

The present disclosure relates generally to testing the operation of flight actuators and, more particularly, to systems and methods for testing flight control surface actuators of aerial refueling booms.

BACKGROUND

Aerial refueling, also referred to as air refueling, in-flight refueling (IFR), air-to-air refueling (AAR), and tanking, is the process of transferring aviation fuel from one aircraft (the tanker) to another aircraft (the receiver) while both aircraft are in flight. One type of refueling system uses an aerial refueling boom, also referred to as a flying boom. However, aerial refueling booms require routine testing of the actuators that move the control surfaces of the boom. Such testing requires removal of the actuators, which grounds the aerial refueling boom if replacement actuators are unavailable during testing and risks damage to fairing structures during removal and reinstallation of the actuators. Accordingly, those skilled in the art continue with research and development efforts in the field of actuator testing for aerial refueling booms.

SUMMARY

Disclosed are examples of a system for testing control surface actuators of an aerial refueling boom, a rudder test apparatus, an elevator test apparatus, a method for testing control surface actuators of an aerial refueling boom, method for testing a rudder actuator, and a method for testing an elevator actuator. The following is a non-exhaustive list of examples, which may or may not be claimed, of the subject matter according to the present disclosure.

In an example, the disclosed system includes a rudder test apparatus and an elevator test apparatus. The rudder test apparatus is configured to be coupled to at least one of a first rudder and a second rudder of an aerial refueling boom. The elevator test apparatus is configured to be coupled to at least one of a first elevator and a second elevator of the aerial refueling boom. With the rudder test apparatus coupled to at least one of the first rudder and the second rudder, a constant rudder test force applied to the rudder test apparatus drives actuation of one of the first rudder or the second rudder against a rudder actuator. With the elevator test apparatus coupled to at least one of the first elevator and the second elevator, a constant elevator test force applied to the elevator test apparatus drives actuation of the first elevator and the second elevator against an elevator actuator.

In another example, the disclosed system includes a crank support configured to be coupled to a body of an aerial refueling boom. The system includes a crank coupled to and pivotable relative to the crank support. The system includes a first rudder clamp coupled to the crank and configured to be coupled to a first rudder of the aerial refueling boom. The system includes a second rudder clamp coupled to the crank and configured to be coupled to a second rudder of the aerial refueling boom. The system includes a first elevator clamp configured to be coupled to a first elevator of the aerial refueling boom. The system includes a second elevator clamp configured to be coupled to a second elevator of the aerial refueling boom. With the first rudder clamp coupled to the first rudder, a constant rudder test force applied to the crank drives actuation of the first rudder against a first rudder actuator. With the second rudder clamp coupled to the second rudder, the constant rudder test force applied to the crank drives actuation of the second rudder against a second rudder actuator. With the first elevator clamp coupled to the first elevator and the second elevator clamp coupled to the second elevator, a constant elevator test force applied to the first elevator clamp and the second elevator clamp drives actuation of the first elevator and the second elevator against the elevator actuator.

In an example, the rudder test apparatus includes a crank support and a crank that is coupled to the crank support. The crank is configured to pivot relative to the crank support. The rudder test apparatus includes at least one of a first rudder clamp and a second rudder clamp. The first rudder clamp is coupled to the crank and is configured to be coupled to a first rudder of an aerial refueling boom. The second rudder clamp is coupled to the crank and is configured to be coupled to a second rudder of an aerial refueling boom. With first rudder clamp coupled to the first rudder, a constant rudder test force applied to the crank drives actuation of the first rudder against a first rudder actuator. With the second rudder clamp coupled to the second rudder, the constant rudder test force applied to the crank drives actuation of the second rudder against a second rudder actuator.

In an example, the elevator test apparatus includes a first elevator clamp and a second elevator clamp. The first elevator clamp is configured to be coupled to a first elevator of an aerial refueling boom. The second elevator clamp is configured to be coupled to the second elevator of the aerial refueling boom. With the first elevator clamp coupled to the first elevator and the second elevator clamp coupled to the second elevator, a constant elevator test force applied to the first elevator clamp and the second elevator clamp drives actuation of the first elevator and the second elevator against an elevator actuator.

In an example, the disclosed method includes steps of: (1) coupling a rudder test apparatus to at least one of a first rudder and a second rudder of an aerial refueling boom; (2) coupling an elevator test apparatus to at least one of a first elevator and a second elevator of the aerial refueling boom; (3) applying a constant rudder test force to the rudder test apparatus; (4) driving actuation of one of the first rudder or the second rudder against a rudder actuator; (5) applying a constant elevator test force to the elevator test apparatus; and (6) driving actuation of the first elevator and the second elevator against an elevator actuator.

In an example, the disclosed method includes steps of: (1) coupling a rudder test apparatus to at least one of a first rudder and a second rudder of an aerial refueling boom; (2) applying a constant rudder test force to the rudder test apparatus; (3) driving actuation of one of the first rudder or the second rudder against a rudder actuator; (4) measuring a rudder actuation time interval; and (5) comparing the rudder actuation time interval to a rudder actuator failure threshold.

In an example, the disclosed method includes steps of: (1) coupling an elevator test apparatus to at least one of a first elevator and a second elevator of an aerial refueling boom; (2) applying a constant elevator test force to the elevator test apparatus; (3) driving actuation of the first elevator and the second elevator against an elevator actuator; (4) measuring an elevator actuation time interval; and (5) comparing the elevator actuation time interval to an elevator actuator failure threshold.

Other examples of the system, the test apparatuses, and the methods will become apparent from the following detailed description, the accompanying drawings, and the appended claims.

BRIEF DESCRIPTION OF THE DRAWINGS

FIGS. 12A and 12B are schematic illustrations of examples of the elevator test apparatus testing an elevator of the aerial refueling boom;

FIG. 13 is a schematic illustration of an example of an elevator clamp of the elevator test apparatus;

DETAILED DESCRIPTION

Figure 2:
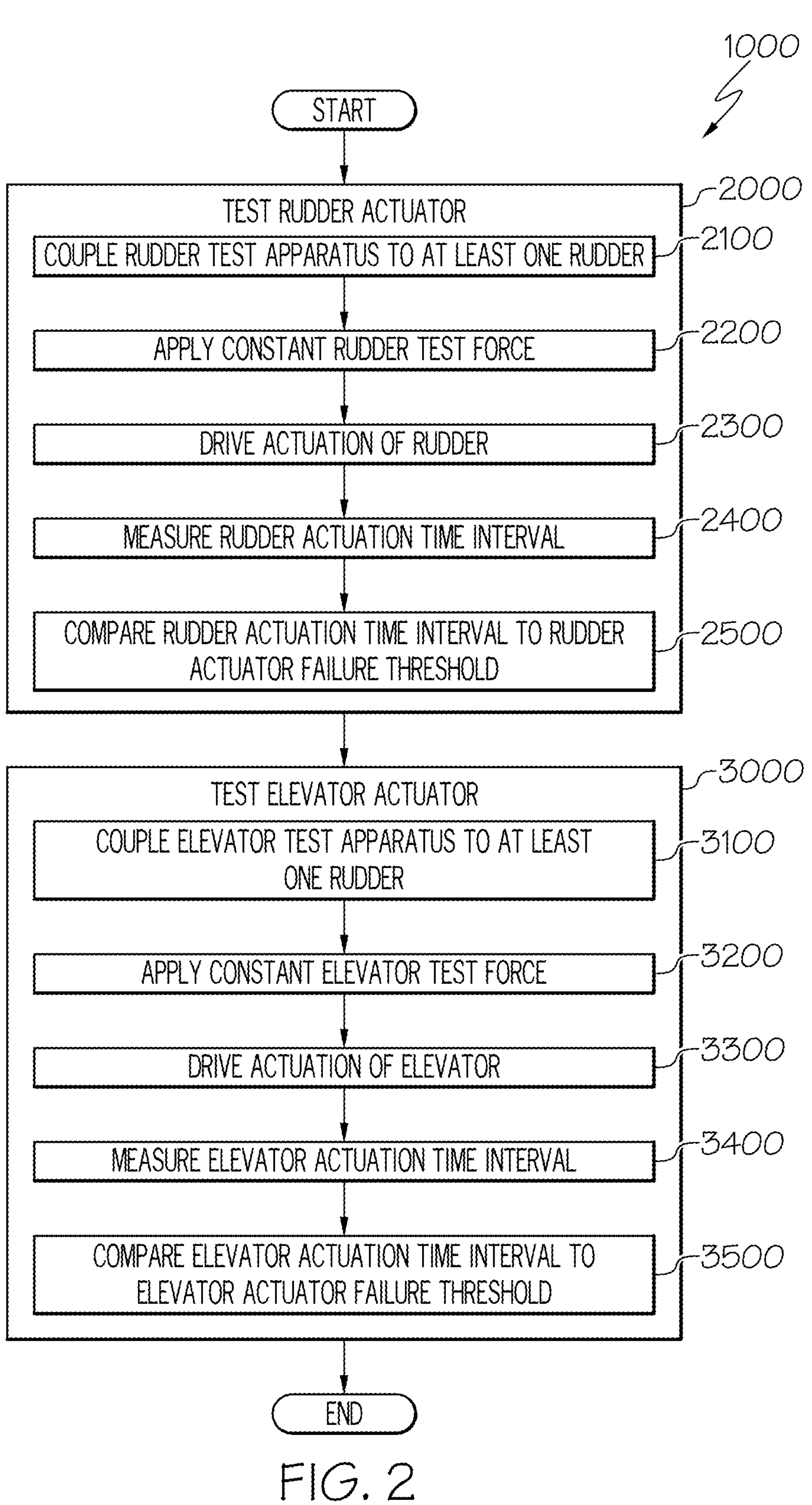
FIG. 2 is a flow diagram of an example of a method for testing flight control surface actuators of aerial refueling booms.

FIG. 2 schematically illustrates an example of an aircraft 1200 for aerial refueling. The aircraft 1200 includes an aerial refueling boom 300, or flying boom. Generally, the aerial refueling boom 300 is a rigid, telescoping tube with movable flight control surfaces 310 that a boom operator on the aircraft 1200 extends and inserts into a receptacle on a receiving aircraft. Examples of the aircraft 1200 include a boom-equipped tanker aircraft (e.g., KC-46 Pegasus).

Figure 3:
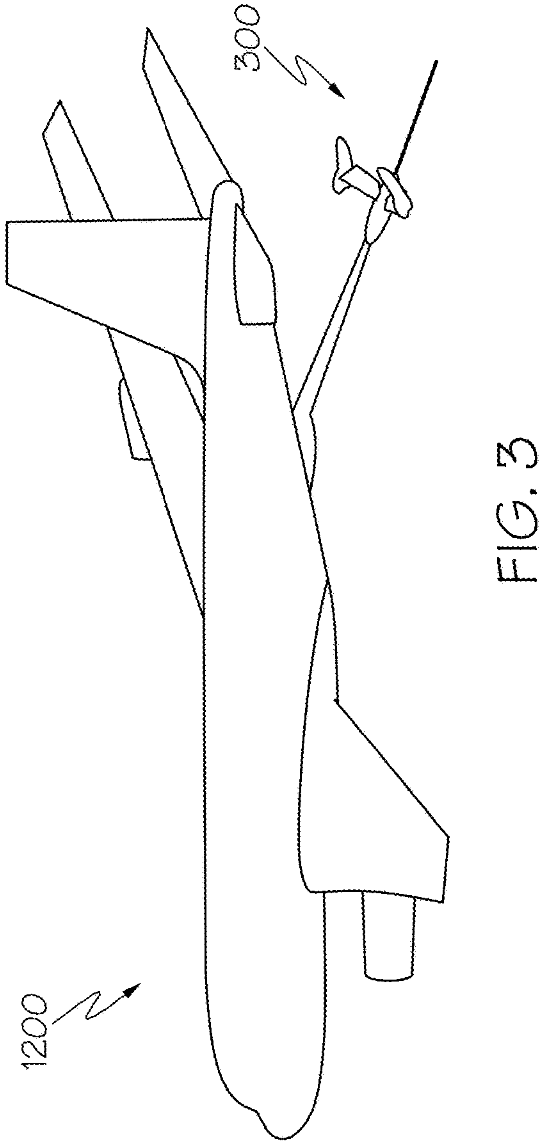
FIG. 3 is a schematic illustration of an example of an aircraft and an aerial refueling boom.
Figure 4:
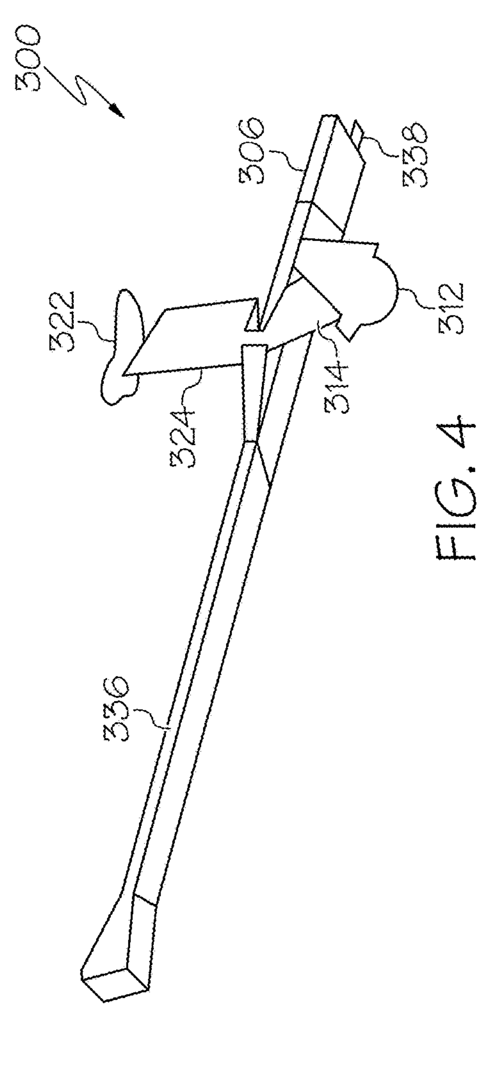
FIG. 4 is a schematic illustration of an example of an aerial refueling boom.

FIG. 3 schematically illustrates an example of the aerial refueling boom 300. The control surfaces 310 of the aerial refueling boom 300 are small movable airfoils that are used to move the aerial refueling boom 300 by creating aerodynamic forces. The control surfaces 310 are actuated (e.g., hydraulically) and controlled by a boom operator using a control stick. The boom operator also telescopes the boom to make the connection with the receiver's receptacle.

Figure 1:
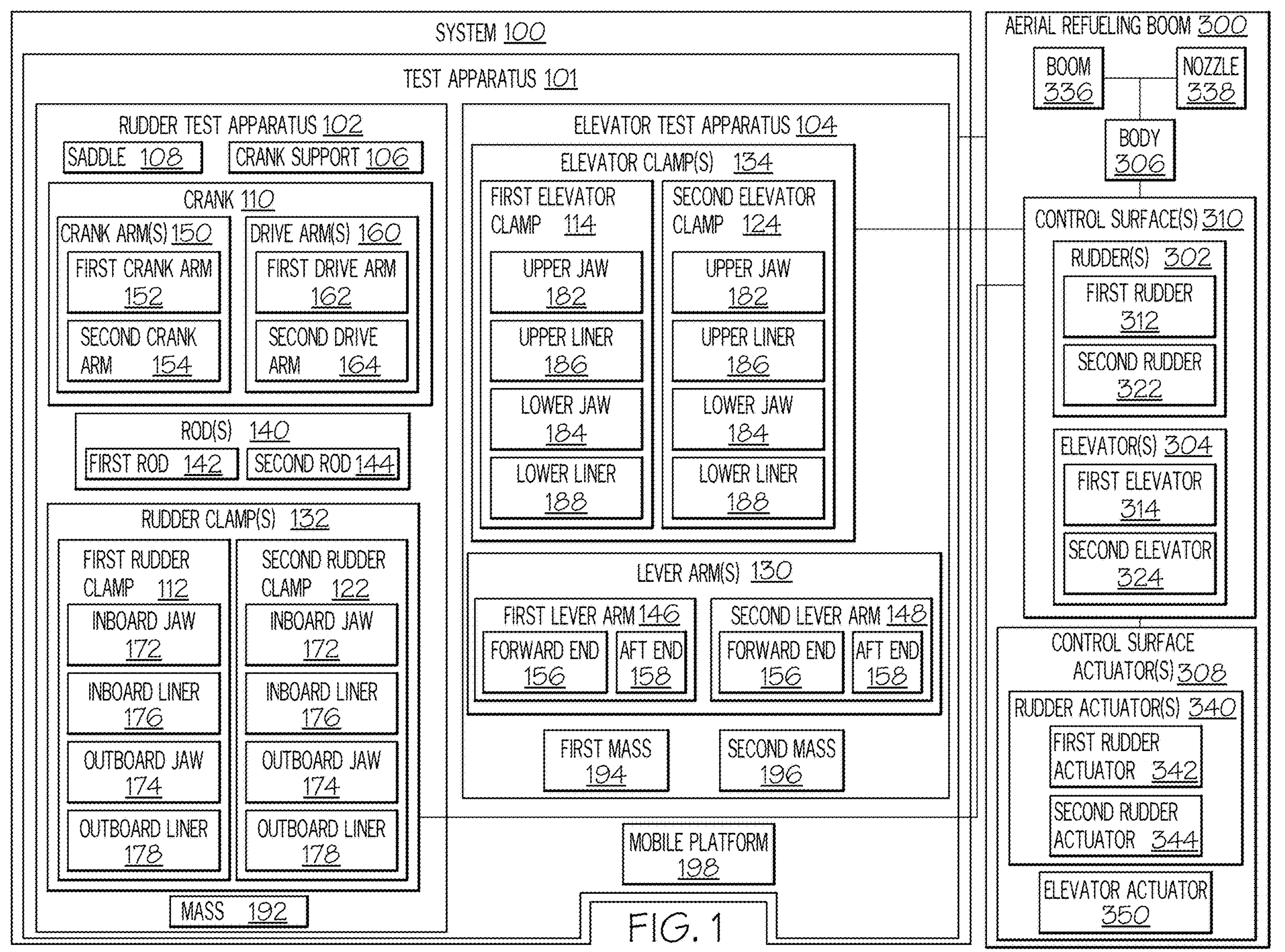
FIG. 1 is a schematic block diagram of an example of a system for testing flight control surface actuators of aerial refueling booms.

As illustrated in FIGS. 1 and 3, generally, the aerial refueling boom 300 includes a boom 336 that is extendable from the aircraft 1200, a body 306 connected to the boom 336, and a nozzle 338 that connects to the receptacle of the receiver aircraft during fuel transfer. The body 306 includes one or more flight control surfaces 310 and one or more control surface actuators 308 that position the control surfaces 310 as directed by the boom operator. In one or more examples, the control surfaces 310 include one or more rudders 302 (e.g., a first rudder 312 and a second rudder 322) and/or one or more elevators 304 (e.g., a first elevator 314 and a second elevator 324). In one or more examples, the control surface actuators 308 includes one or more rudder actuator 340 (e.g., a first rudder actuator 342 and a second rudder actuator 344) and one or more elevator actuators 350.

Referring now to FIGS. 1 and 5-13, by way of examples, the present disclosure is directed to a system 100 for testing one or more of the control surface actuators 308 of the aerial refueling boom 300. The following are examples of the system 100, according to the present disclosure. Examples of the system 100 include a number of elements, features, and components. Not all of the elements, features, and/or components described or illustrated in one example are required in that example. Some or all of the elements, features, and/or components described or illustrated in one example can be combined with other examples in various ways without the need to include other elements, features, and/or components described in those other examples, even though such combination or combinations are not explicitly described or illustrated by example herein.

As illustrated in FIG. 1, in one or more examples, the system 100 includes a test apparatus 101. The test apparatus 101 is configured to be coupled to one or more of the control surfaces 310 of the aerial refueling boom 300 for testing one or more of the control surface actuators 308 of the aerial refueling boom 300. In one or more examples, the test apparatus 101 includes or takes the form of a rudder test apparatus 102. In one or more examples, the test apparatus 101 includes or takes the form of an elevator test apparatus 104. In one or more examples, the test apparatus 101 includes or takes the form of both the rudder test apparatus 102 and the elevator test apparatus 104.

Figure 5:
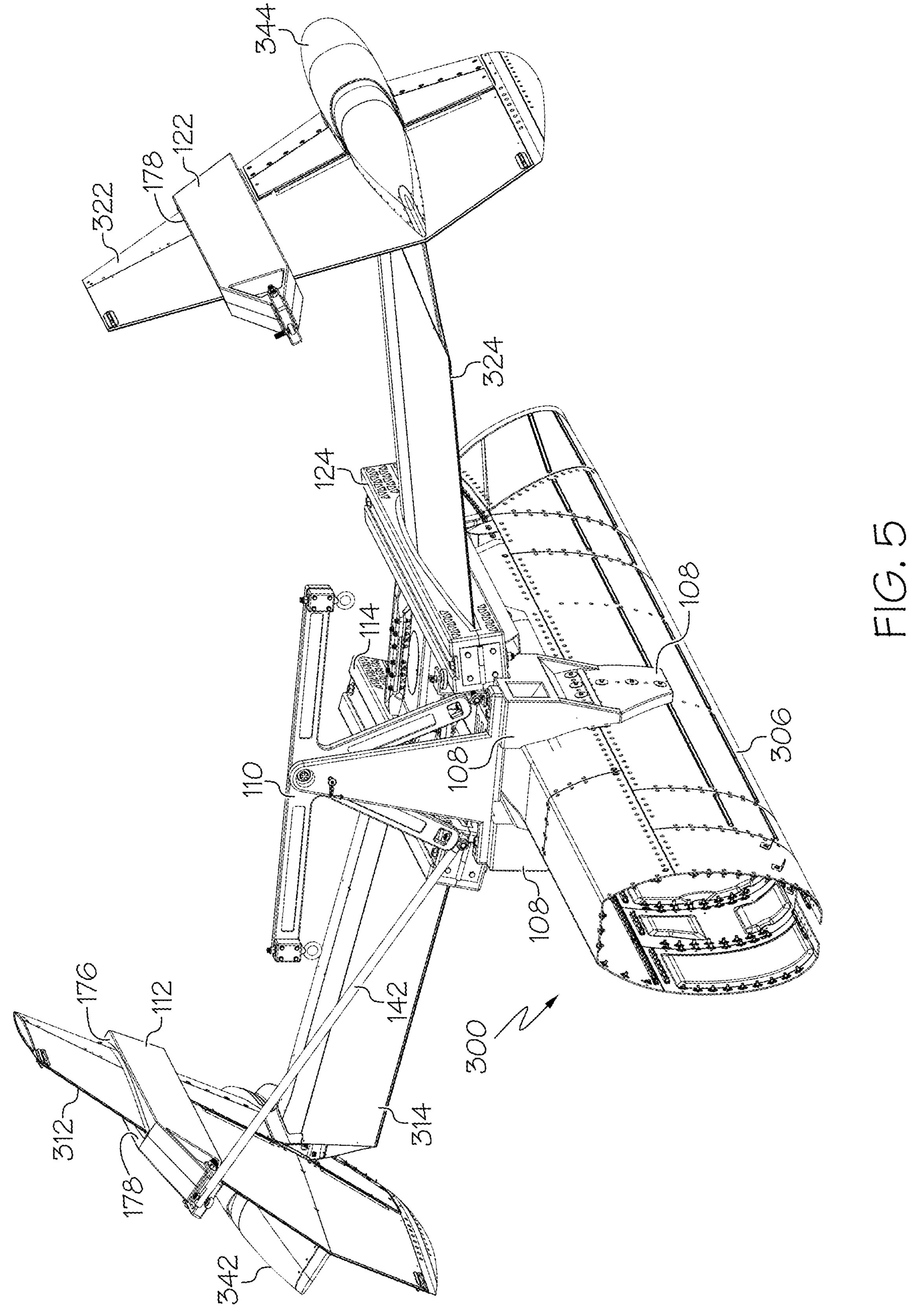
FIG. 5 is a schematic illustration of an example of a rudder test apparatus of the system applied to the aerial refueling boom.

FIG. 5 illustrates an example of the rudder test apparatus 102 coupled to the aerial refueling boom 300 for testing the rudder actuator 340 of the aerial refueling boom 300. The rudder test apparatus 102 is configured to move (e.g., pivot) the rudder 302 between a neutral position, an inboard (e.g., fully inboard or fully pivoted) position, and an outboard (e.g., fully outboard or fully pivoted) position against the rudder actuator 340 and, thus, move (e.g., extend and retract) the rudder actuator 340 between a neutral position, a retracted (e.g., fully retracted) position, an extended (e.g., fully extended) position in response to a constant testing load or force applied to the rudder 302. The time interval required for the rudder 302 to fully move from a start position to an end position against the rudder actuator 340 and, thus, for the rudder actuator 340 to move from the start position to the end position, is measured and compared to a threshold. If the measured time interval is greater than the threshold, the rudder actuator 340 passes the test. If the measured time interval is less than the threshold, the rudder actuator 340 fails the test.

Figures 7A, 7B:
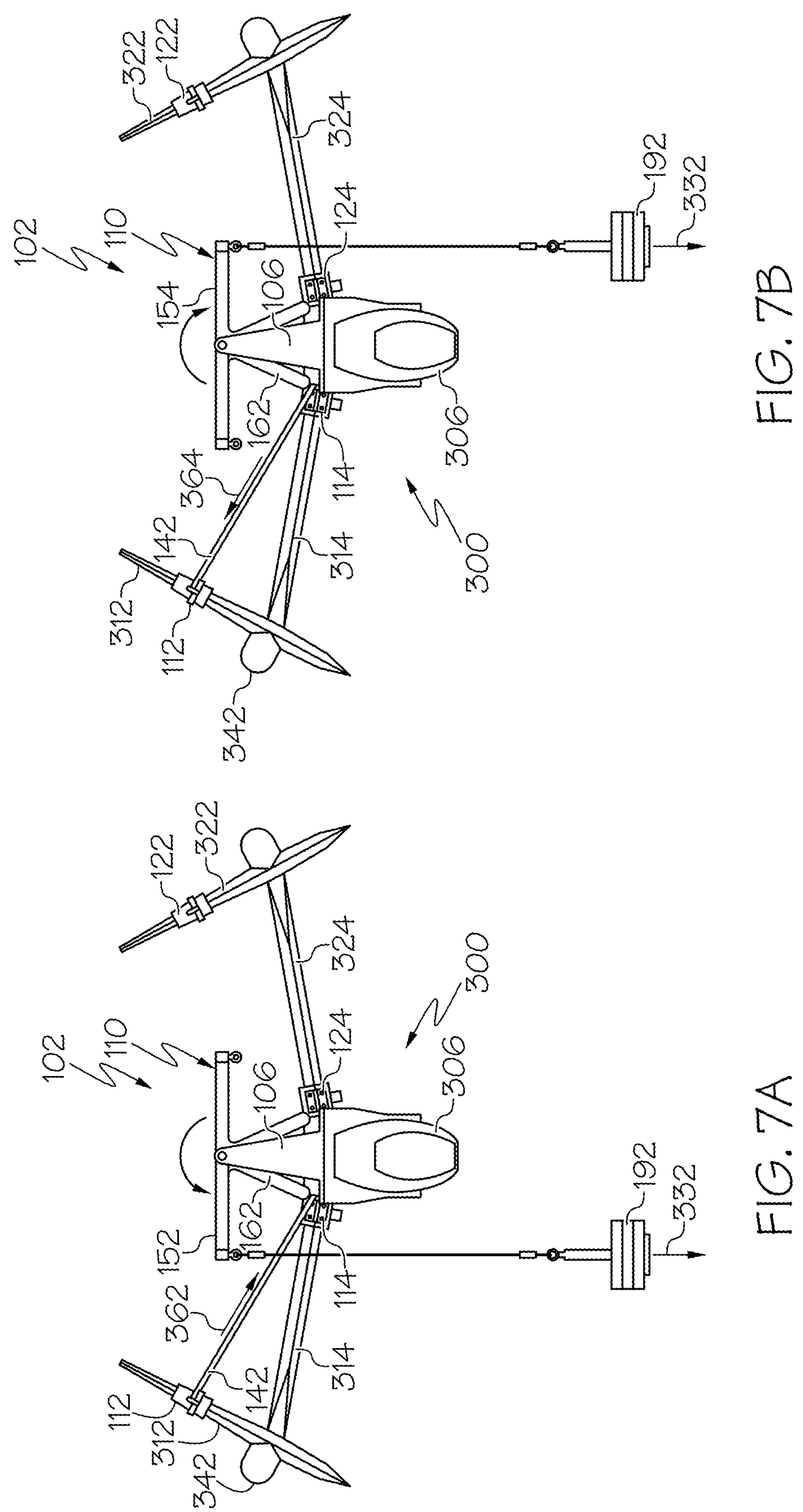
FIGS. 7A and 7B are schematic illustrations of examples of the rudder test apparatus testing a first rudder of the aerial refueling boom.
Figure 8A:
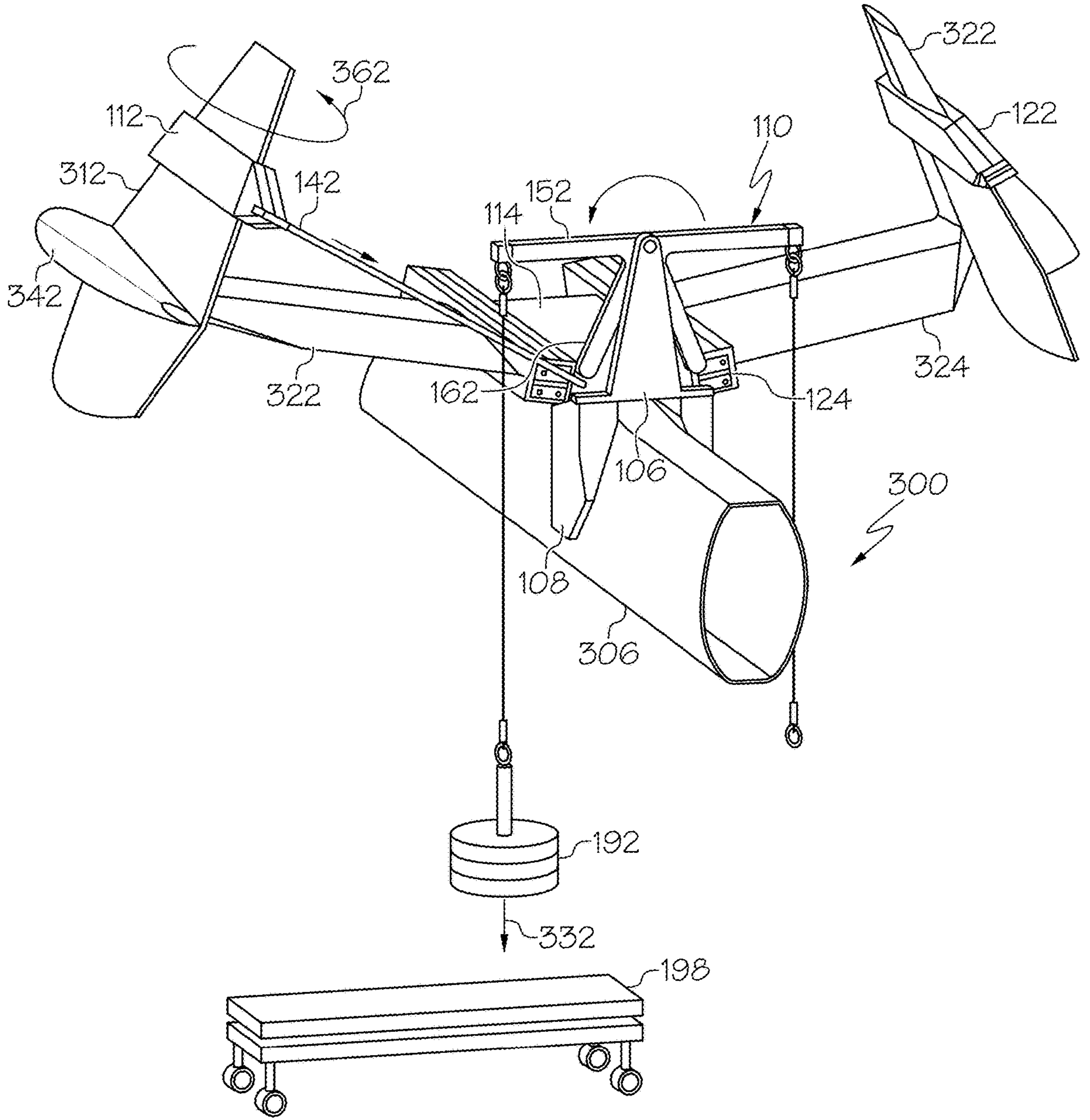
FIGS. 8A and 8B are schematic illustrations of examples of the rudder test apparatus testing the first rudder of the aerial refueling boom.

FIGS. 7A and 8A illustrate examples of the rudder test apparatus 102 coupled to the aerial refueling boom 300 for testing the first rudder actuator 342 by moving (e.g., pivoting) the first rudder 312 in an inboard direction 362 against the first rudder actuator 342 in response to application of a constant load. In one or more examples, the first rudder actuator 342 is tested by moving the first rudder 312 from the neutral (e.g., start) position to the inboard (e.g., end) position. In one or more examples, the first rudder actuator 342 is tested by moving the first rudder 312 from the outboard (e.g., start) position to the inboard (e.g., end) position.

Figure 8B:
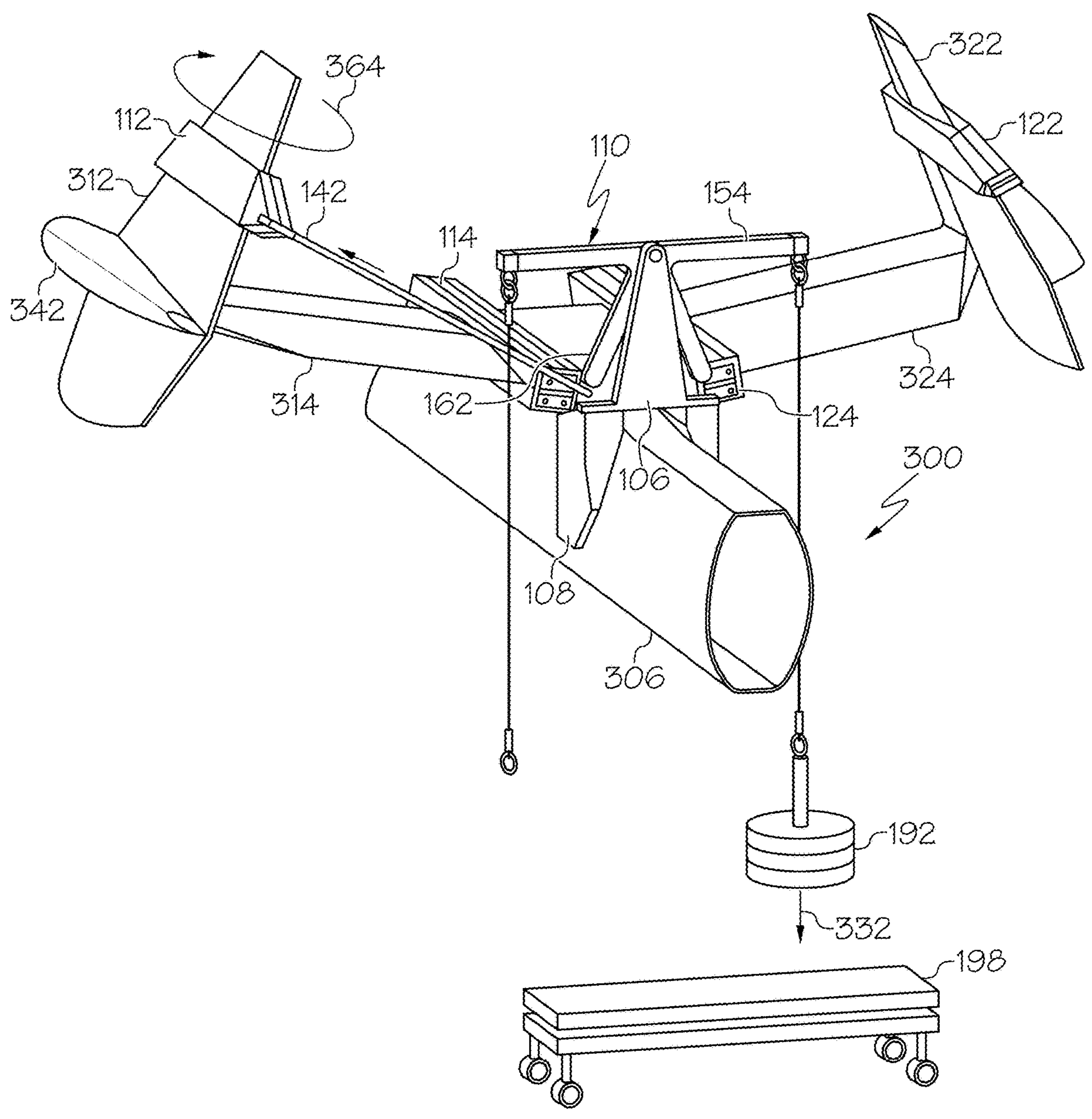

FIGS. 7B and 8B illustrate examples of the rudder test apparatus 102 coupled to the aerial refueling boom 300 for testing the first rudder actuator 342 by moving (e.g., pivoting) the first rudder 312 in an outboard direction 364 against the first rudder actuator 342 in response to application of a constant load. In one or more examples, the first rudder actuator 342 is tested by moving the first rudder 312 from the neutral (e.g., start) position to the outboard (e.g., end) position. In one or more examples, the first rudder actuator 342 is tested by moving the first rudder 312 from the inboard (e.g., start) position to the outboard (e.g., end) position.

Figures 9A, 9B:
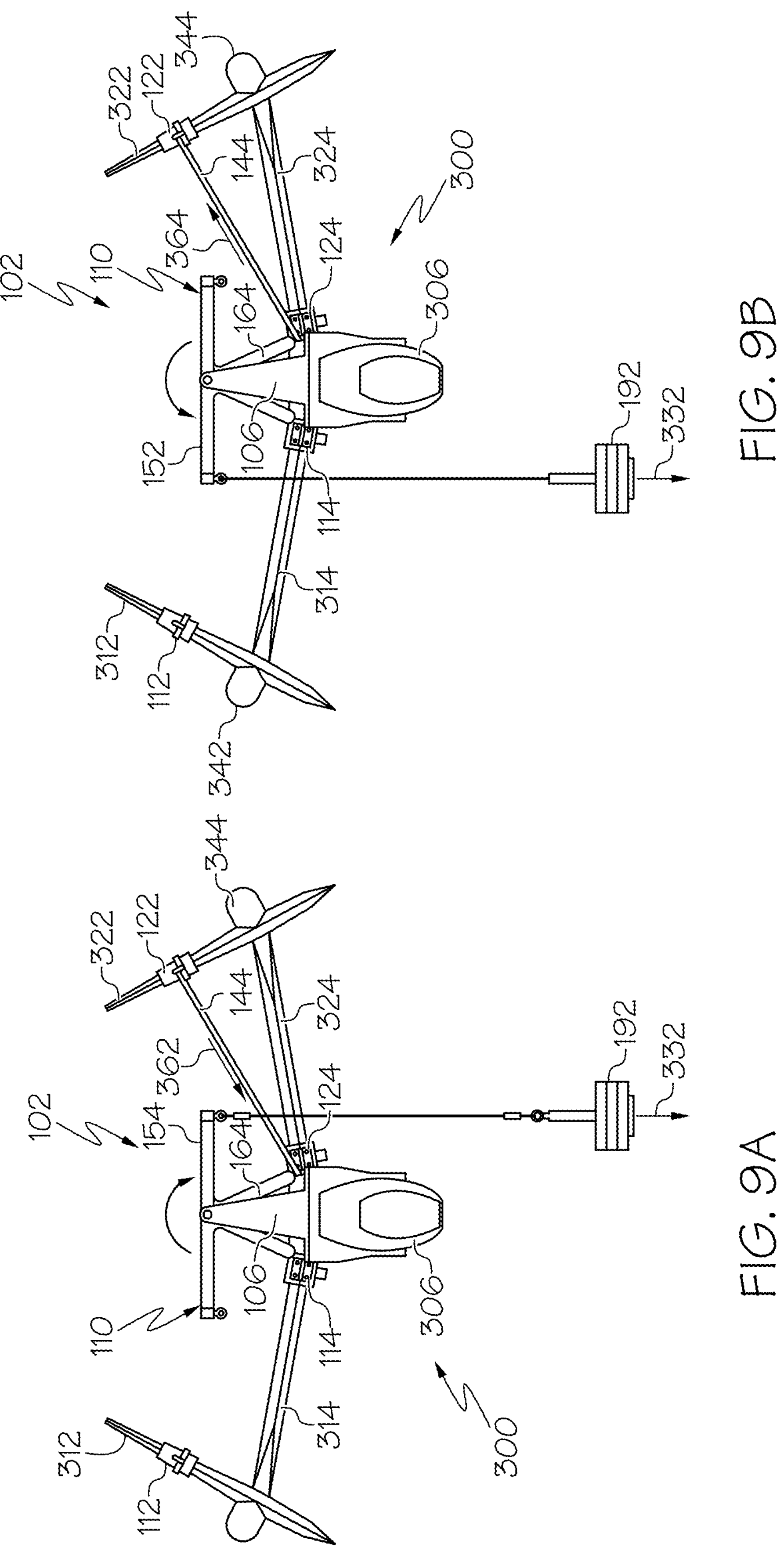
FIGS. 9A and 9B are schematic illustrations of examples of the rudder test apparatus testing a second rudder of the aerial refueling boom.
Figure 10A:
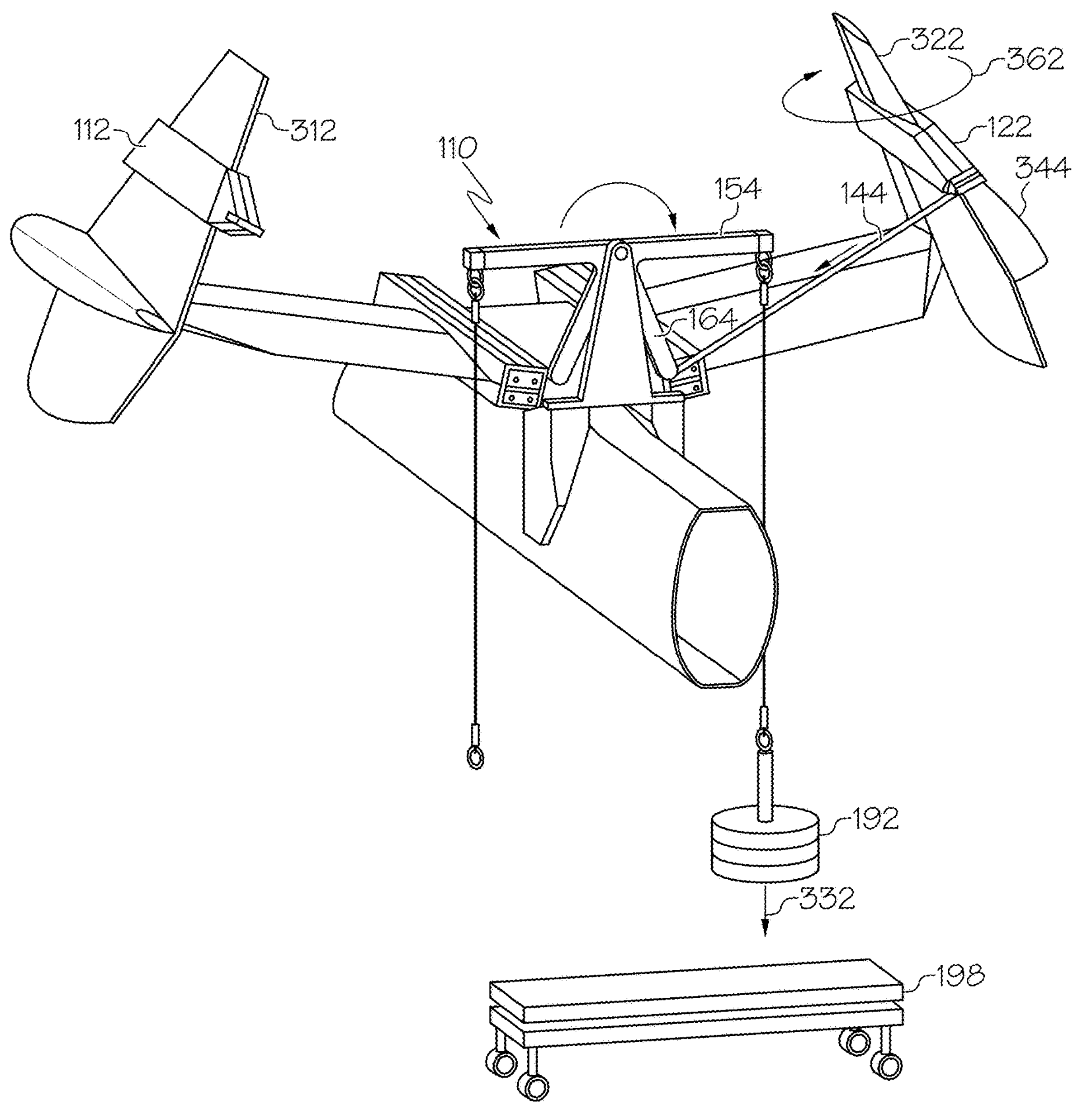
FIGS. 10A and 10B are schematic illustrations of examples of the rudder test apparatus testing the second rudder of the aerial refueling boom.

FIGS. 9A and 10A illustrate examples of the rudder test apparatus 102 coupled to the aerial refueling boom 300 for testing the second rudder actuator 344 by moving (e.g., pivoting) the second rudder 322 in the inboard direction 362 against the second rudder actuator 344 in response to application of a constant load. In one or more examples, the second rudder actuator 344 is tested by moving the second rudder 322 from the neutral (e.g., start) position to the inboard (e.g., end) position. In one or more examples, the second rudder actuator 344 is tested by moving the second rudder 322 from the outboard (e.g., start) position to the inboard (e.g., end) position.

Figure 10B:
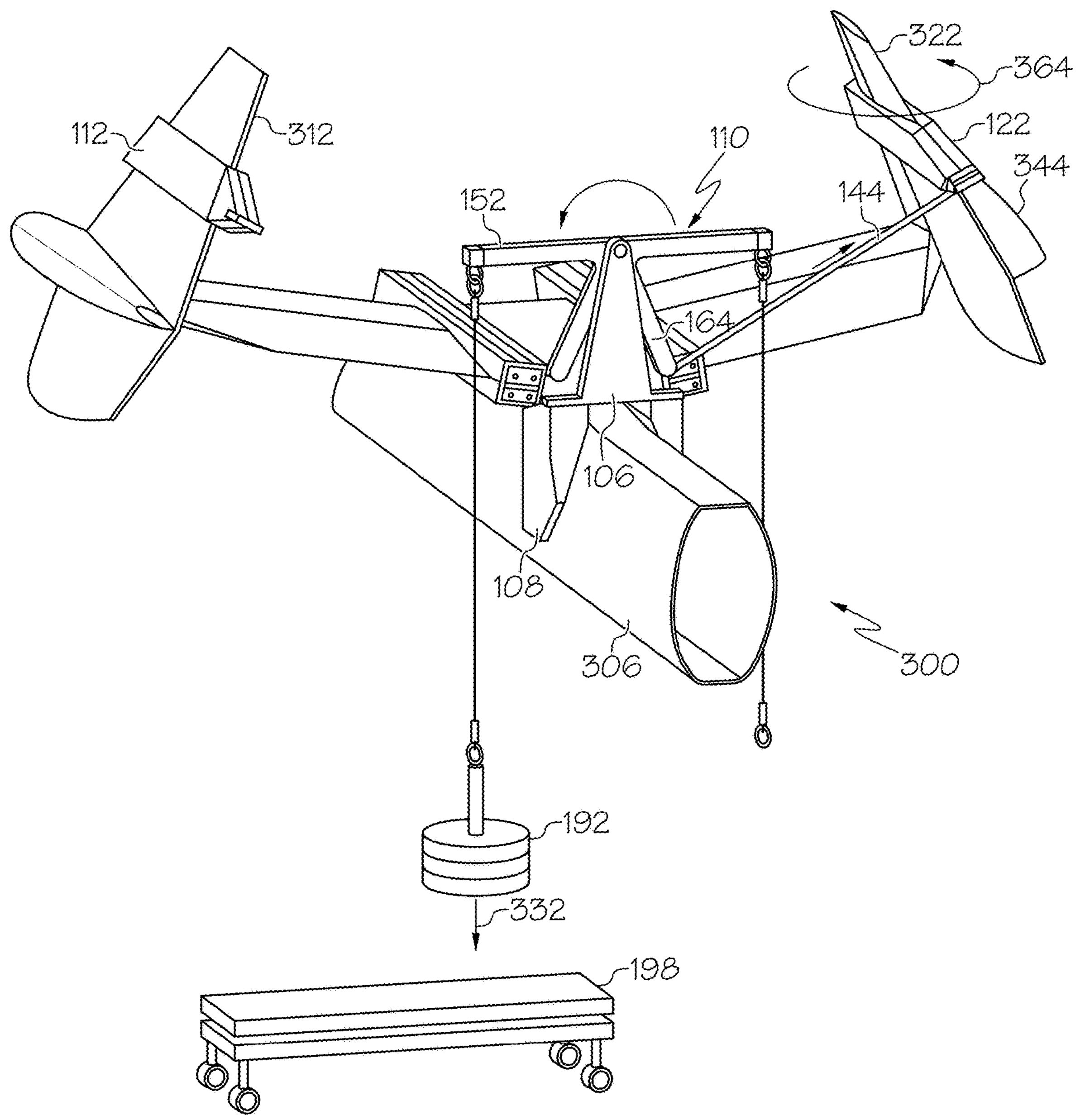

FIGS. 9B and 10B illustrate examples of the rudder test apparatus 102 coupled to the aerial refueling boom 300 for testing the second rudder actuator 344 by moving (e.g., pivoting) the second rudder 322 in the outboard direction 364 against the second rudder actuator 344 in response to application of a constant load. In one or more examples, the second rudder actuator 344 is tested by moving the second rudder 322 from the neutral (e.g., start) position to the outboard (e.g., end) position. In one or more examples, the second rudder actuator 344 is tested by moving the second rudder 322 from the inboard (e.g., start) position to the outboard (e.g., end) position.

As illustrated in FIGS. 1, 5 and 7A-10B, in one or more examples, the rudder test apparatus 102 is configured to be coupled to at least one the first rudder 312 and the second rudder 322 of the aerial refueling boom 300. With the rudder test apparatus 102 coupled to at least one of the first rudder 312 and the second rudder 322, a constant rudder test force 332 can be applied to the rudder test apparatus 102. Application of the constant rudder test force 332 drives actuation of one of the first rudder 312 or the second rudder 322 against the rudder actuator 340 (e.g., a corresponding one of the first rudder actuator 342 and the second rudder actuator 344). The rudder test apparatus 102 enables testing of the rudder actuator 340 through application of a constant, predetermined load (e.g., constant rudder test force 332) and measurement of the stroke rate (e.g., time interval) of the rudder actuator 340 in response to application of the load.

Figure 6:
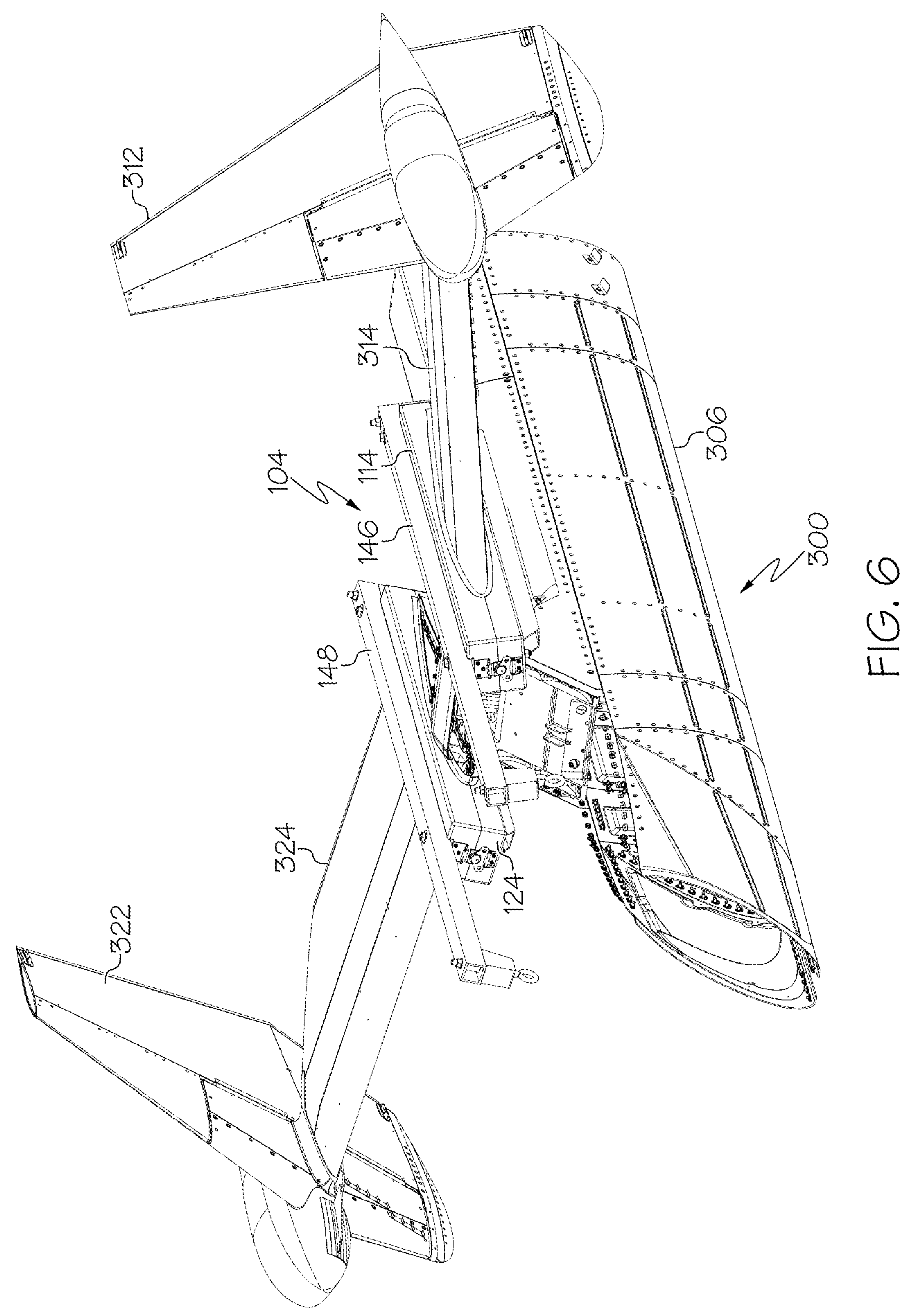
FIG. 6 is a schematic illustration of an example of an elevator test apparatus of the system applied to the aerial refueling boom.

FIG. 6 illustrates an example of the elevator test apparatus 104 coupled to the aerial refueling boom 300 for testing the elevator actuator 350 of the aerial refueling boom 300. The elevator test apparatus 104 is configured to move (e.g., pivot) the elevator 304 between a neutral position, a trailing edge down (e.g., fully pivoted) position, and a trailing edge up (e.g., fully pivoted) position against the elevator actuator 350 and, thus, move (e.g., extend and retract) the elevator actuator 350 between a neutral position, a retracted (e.g., fully retracted) position, an extended (e.g., fully extended) position in response to a constant testing load or force applied to the elevator 304. The time interval required for the elevator 304 to fully move from a start position to an end position against the elevator actuator 350 and, thus, for the elevator actuator 350 to move from the start position to the end position, is measured and compared to a threshold. If the measured time interval is greater than the threshold, the elevator actuator 350 passes the test. If the measured time interval is less than the threshold, the elevator actuator 350 fails the test.

Figure 11A:
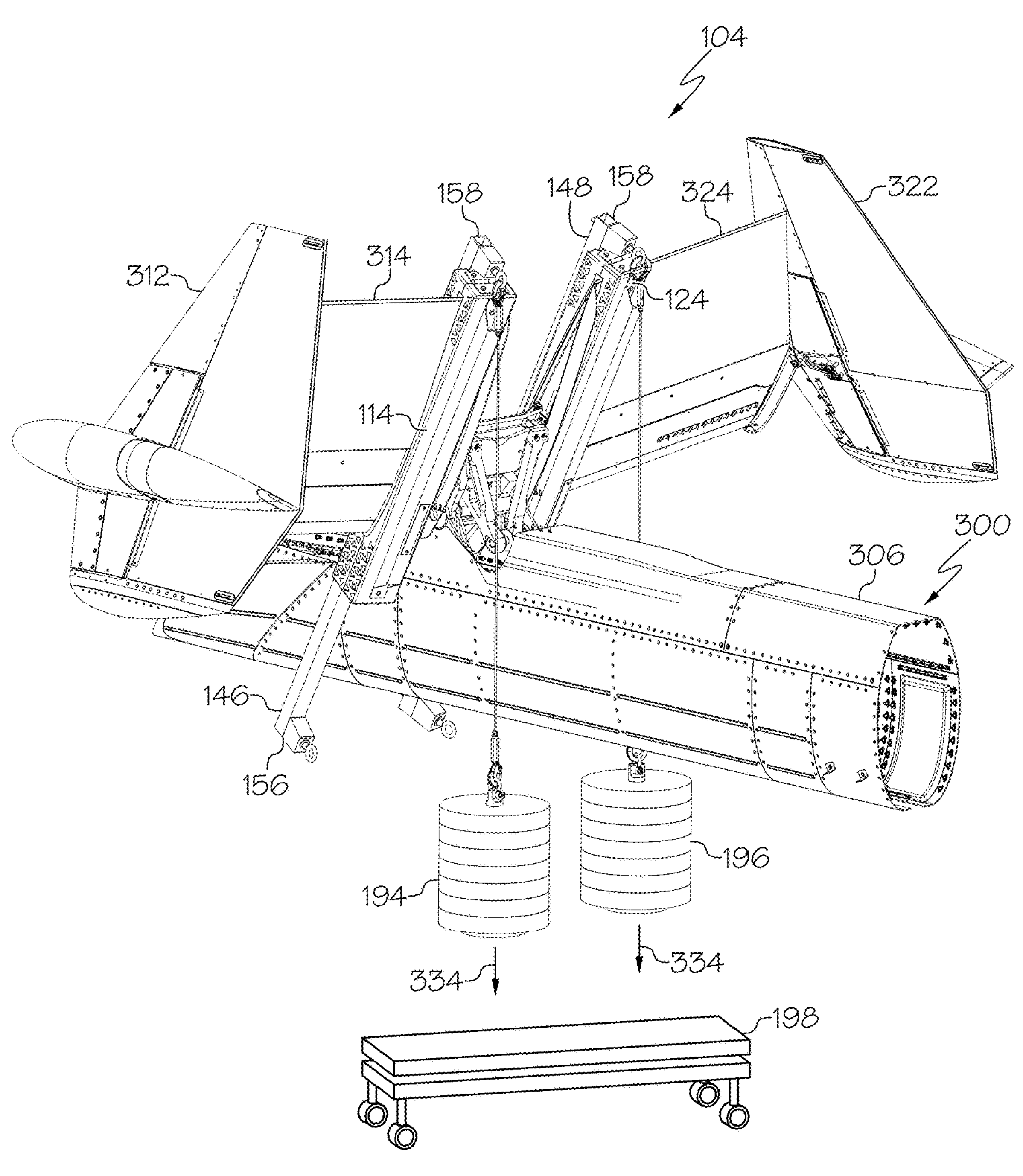
FIGS. 11A and 11B are schematic illustrations of examples of the elevator test apparatus testing a first elevator and a second elevator of the aerial refueling boom.

FIGS. 11A and 12A illustrate examples of the elevator test apparatus 104 coupled to the aerial refueling boom 300 for testing the elevator actuator 350 by moving (e.g., pivoting) the first elevator 314 and the second elevator 324 in a trailing edge up direction 366 against the elevator actuator 350 in response to application of a constant load. In one or more examples, the elevator actuator 350 is tested by moving the first elevator 314 and the second elevator 324 from the trailing edge down (e.g., start) position (FIG. 11A) to the trailing edge up (e.g., end) position. In one or more examples, the elevator actuator 350 is tested by moving the first elevator 314 and the second elevator 324 from the neutral (e.g., start) position to the trailing edge up (e.g., end) position.

Figure 11B:
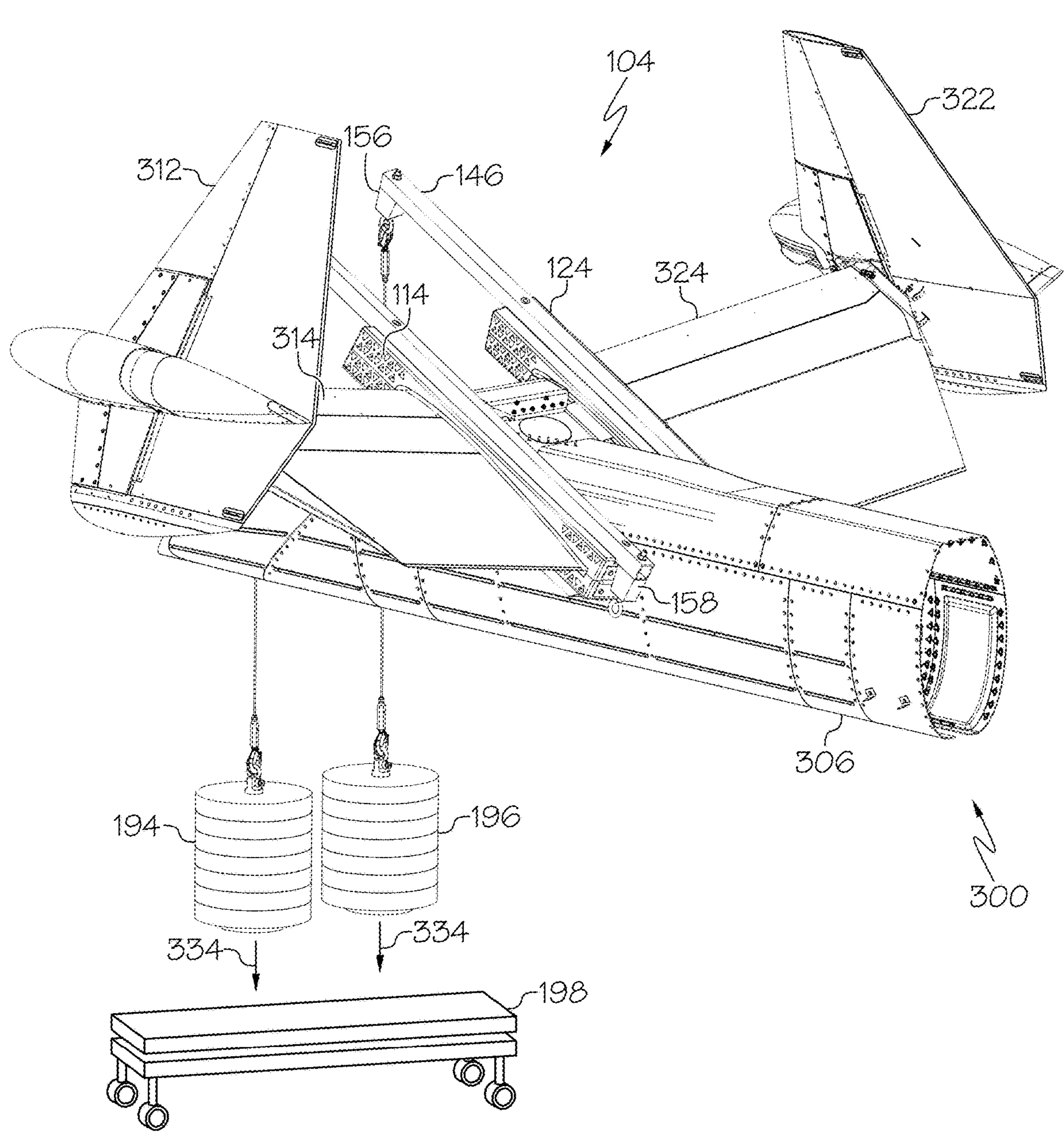

FIGS. 11B and 12B illustrate examples of the elevator test apparatus 104 coupled to the aerial refueling boom 300 for testing the elevator actuator 350 by moving (e.g., pivoting) the first elevator 314 and the second elevator 324 in a trailing edge down direction 368 against the elevator actuator 350 in response to application of a constant load. In one or more examples, the elevator actuator 350 is tested by moving the first elevator 314 and the second elevator 324 from the trailing edge up (e.g., start) position (FIG. 11B) to the trailing edge down (e.g., end) position. In one or more examples, the elevator actuator 350 is tested by moving first elevator 314 and the second elevator 324 from the neutral (e.g., start) position to the trailing edge down (e.g., end) position.

As illustrated in FIGS. 1, 6 and 11A-12B, in one or more examples, the elevator test apparatus 104 is configured to be coupled to at least one of the first elevator 314 and the second elevator 324 of the aerial refueling boom 300. With the elevator test apparatus 104 coupled to at least one of the first elevator 314 and the second elevator 324, a constant elevator test force 334 can be applied to the elevator test apparatus 104. Application of the constant elevator test force 334 drives actuation of the first elevator 314 and the second elevator 324 against the elevator actuator 350. The elevator test apparatus 104 enables testing of the elevator actuator 350 through application of a constant, predetermined load (e.g., constant elevator test force 334) and measurement of a stroke rate of the elevator actuator 350 in response to the load.

As illustrated in FIGS. 1, 5 and 7A-10B, in one or more examples, the rudder test apparatus 102 includes a crank support 106, a crank 110, and at least one rudder clamp 132. The crank support 106 is configured to be coupled to a body 306 of the aerial refueling boom 300. The crank 110 is coupled to the crank support 106. The crank 110 is pivotable relative to the crank support 106. The rudder clamp 132 is coupled to the crank 110 and is configured to be coupled to one of the rudders 302 of the aerial refueling boom 300. Rotational movement of the crank 110 relative to the crank support 106 moves the rudder clamp 132, thereby moving (e.g., pivoting) the rudder 302 coupled to the rudder clamp 132.

As illustrated in FIGS. 7A-8B, in one or more examples, the rudder clamp 132 includes a first rudder clamp 112. The first rudder clamp 112 is coupled to the crank 110 and is configured to be coupled to the first rudder 312. With the first rudder clamp 112 coupled to the first rudder 312, the constant rudder test force 332 applied to the crank 110 drives actuation (e.g., pivotal movement) of the first rudder 312 against the first rudder actuator 342. In these examples, selective application of the constant rudder test force 332 the moves (e.g., pivots) the first rudder 312 in the inboard direction 362 (FIG. 8A) or the outboard direction 364 (FIG. 8B).

As illustrated in FIGS. 9A-10B, in one or more examples, the rudder clamp 132 includes a second rudder clamp 122. The second rudder clamp 122 is coupled to the crank 110 and is configured to be coupled to the second rudder 322. With the second rudder clamp 122 coupled to the second rudder 322, the constant rudder test force 332 applied to the crank 110 drives actuation of the second rudder 322 against the second rudder actuator 344. In these examples, selective application of the constant rudder test force 332 the moves (e.g., pivots) the second rudder 322 in the inboard direction 362 (FIG. 10B) or the outboard direction 364 (FIG. 10A).

As illustrated in FIGS. 1, 5 and 7A-10B, in one or more examples, the rudder test apparatus 102 includes a saddle 108. The saddle 108 is configured to receive a portion of the body 306 of the aerial refueling boom 300. The saddle 108 holds the crank support 106 on the body 306 of the aerial refueling boom 300 during testing of the rudder actuator 340. The crank support 106 is coupled to the saddle 108.

As illustrated in FIG. 1, the rudder test apparatus 102 includes at least one rod 140. The rod 140 is configured to couple the crank 110 and the rudder clamp 132 together. The rod 140 is configured to transfer motion and force from the crank 110 to the rudder clamp 132 and, thus, to the rudder 302 engaged by the rudder clamp 132. In one or more examples, the rod 140 includes or takes the form of a first rod 142. In one or more examples, the rod 140 includes or takes the form of a second rod 144.

As illustrated in FIGS. 5 and 7A-8B, in one or more examples, the first rod 142 extends between crank 110 and the first rudder clamp 112. The first rod 142 is configured to couple the first rudder clamp 112 to the crank 110. The first rod 142 is configured to transfer motion and force from the crank 110 to the first rudder clamp 112 and, thus, to the first rudder 312 engaged by the first rudder clamp 112. In one or more examples, a first end of the first rod 142 is coupled to the crank 110 and a second end of the first rod 142 is coupled to the first rudder clamp 112.

As illustrated in FIGS. 5 and 9A-10B, in one or more examples, the second rod 144 extends between the crank 110 and the second rudder clamp 122. The second rod 144 is configured to couple the second rudder clamp 122 to the crank 110. The second rod 144 is configured to transfer motion and force from the crank 110 to the second rudder clamp 122 and, thus, to the second rudder 322 engaged by the second rudder clamp 122. In one or more examples, a first end of the second rod 144 is coupled to the crank 110 and a second end of the second rod 144 is coupled to the second rudder clamp 122.

As illustrated in FIG. 1, in one or more examples, the crank 110 includes at least one crank arm 150 and at least one drive arm 160. The crank arm 150 enables application of the constant rudder test force 332 to the crank 110. The drive arm 160 enables connection of the rod 140 (e.g., first rod 142 or second rod 144) to the rudder clamp 132 (first rudder clamp 112 or second rudder clamp 122). In one or more examples, the crank arm 150 and the drive arm 160 are oriented at a non-zero angle relative to each other such that application of the constant rudder test force 332 in one direction causes rotation or the crank 110 and movement of the rudder clamp 132 in another direction.

As illustrated in FIGS. 1, 5 and 7A-8B, in one or more examples, the crank 110 includes a first crank arm 152 and a first drive arm 162. In one or more examples, the first drive arm 162 is oriented at a non-zero angle relative to the first crank arm 152. In one or more examples, the first drive arm 162 is oriented at an acute angle relative to the first crank arm 152. In one or more examples, the first drive arm 162 is at least approximately perpendicular to the first crank arm 152. As illustrated in FIGS. 7A and 8A, with the first rudder clamp 112 coupled to the first rudder 312 and to the first drive arm 162 by the first rod 142, the constant rudder test force 332 applied to the first crank arm 152 drives actuation of (e.g., pulls) the first rudder 312 in the inboard direction 362 against the first rudder actuator 342.

As illustrated in FIGS. 1, 5 and 7A-8B, in one or more examples, the crank 110 includes a second crank arm 154. In one or more examples, the second crank arm 154 is at least approximately parallel to the first crank arm 152. In one or more examples, the first drive arm 162 is oriented at a non-zero angle relative to the second crank arm 154. In one or more examples, the first drive arm 162 is oriented at an obtuse angle relative to the second crank arm 154. In one or more examples, the first drive arm 162 is at least approximately perpendicular to the second crank arm 154. As illustrated in FIGS. 7B and 8B, with the first rudder clamp 112 coupled to the first rudder 312 and the first drive arm 162 by the first rod 142, the constant rudder test force 332 applied to the second crank arm 154 drives actuation of (e.g., pushes) the first rudder 312 in the outboard direction 364 against the first rudder actuator 342.

As illustrated in FIGS. 1, 5 and 9A-10B, in one or more examples, the crank 110 includes a second drive arm 164. In one or more examples, the second drive arm 164 is oriented at a non-zero angle relative to the second crank arm 154. In one or more examples, the second drive arm 164 is oriented at an acute angle relative to the second crank arm 154. In one or more examples, the second drive arm 164 is at least approximately perpendicular to the second crank arm 154. As illustrated in FIGS. 9A and 10A, with the second rudder clamp 122 coupled to the second rudder 322 and to the second drive arm 164 by the second rod 144, the constant rudder test force 332 applied to the second crank arm 154 drives actuation of (e.g., pulls) the second rudder 322 in the inboard direction 362 against the second rudder actuator 344.

As illustrated in FIGS. 1, 5 and 9A-10B, in one or more examples, the second drive arm 164 is oriented at a non-zero angle relative to the first crank arm 152. In one or more examples, the second drive arm 164 is oriented at an obtuse angle relative to the first crank arm 152. In one or more examples, the second drive arm 164 is at least approximately perpendicular to the first crank arm 152. As illustrated in FIGS. 9B and 10B, with the second rudder clamp 122 coupled to the second rudder 322 and to the second drive arm 164 by the second rod 144, the constant rudder test force 332 applied to the first crank arm 152 drives actuation of (e.g., pushes) the second rudder 322 in the outboard direction 364 against the second rudder actuator 344.

As illustrated in FIGS. 1 and 5, in one or more examples, each one of the first rudder clamp 112 and the second rudder clamp 122 includes an inboard jaw 172 and an outboard jaw 174. The inboard jaw 172 and the outboard jaw 174 are movable relative to each other between an open position and a closed position. In one or more examples, the inboard jaw 172 and the outboard jaw 174 are hingedly coupled together and pivotable relative to each other. In one or more examples, the inboard jaw 172 and the outboard jaw 174 are configured to be fastened or otherwise secured together in the closed position around the rudder 302.

As illustrated in FIGS. 1 and 5, in one or more examples, each one of the first rudder clamp 112 and the second rudder clamp 122 includes an inboard liner 176 and an outboard liner 178. The inboard liner 176 is coupled to the inboard jaw 172. The outboard liner 178 is coupled to the outboard jaw 174. The inboard liner 176 and the outboard liner 178 protect the aerodynamic surface of the rudder 302 when the rudder clamp 132 is coupled to the rudder 302.

As illustrated in FIGS. 1, 5 and 7A-10A, in one or more examples of the system 100, the rudder test apparatus 102 includes a first elevator clamp 114 and a second elevator clamp 124. In these examples, the first elevator clamp 114 is coupled to the crank support 106 and is configured to be coupled to the first elevator 314 to inhibit motion of the first elevator 314. With the first elevator clamp 114 coupled to the first elevator 314 and the crank support 106, the first elevator clamp 114 inhibits motion of the first elevator 314 during testing (e.g., movement) of the rudder actuator 340. In these examples, the second elevator clamp 124 is coupled to the crank support 106 and is configured to be coupled to the second elevator 324 to inhibit motion of the second elevator 324. With the second elevator clamp 124 coupled to the second elevator 324 and the crank support 106, the second elevator clamp 124 inhibits motion of the second elevator 324 during testing (e.g., movement) of the rudder actuator 340.

As illustrated in FIGS. 1 and 7A-10A, in one or more examples, the system 100 includes a mass 192. The mass 192 is configured to be coupled to the crank 110. In one or more examples, the mass 192 is suspended from the crank 110, such as from the crank arm 150 (e.g., first crank arm 152 or second crank arm 154). With the mass 192 coupled to and suspended from the crank 110, the mass 192 generates the constant rudder test force 332.

As illustrated in FIGS. 1, 8A, 8B, 10A and 10B, in one or more examples, the system 100 includes a mobile platform 198. The mobile platform 198 is any suitable mechanism configured to support and selectively release the mass 192, such as a scissor lift. In one or more examples, with the mass 192 coupled to (e.g., suspended from) the crank 110 and the rudder 302 in the start position, the mass 192 is supported by the mobile platform 198. The mobile platform 198 releases the mass 192 such that the mass 192 generates the constant rudder test force 332 and moves the rudder 302 to the end position.

As illustrated in FIGS. 1, 6, and 11A-13, in one or more examples of the system 100, the elevator test apparatus 104 includes the first elevator clamp 114 and the second elevator clamp 124. The first elevator clamp 114 is configured to be coupled to the first elevator 314. The second elevator clamp 124 configured to be coupled to the second elevator 324. With the first elevator clamp 114 coupled to the first elevator 314 and the second elevator clamp 124 coupled to the second elevator 324, the constant elevator test force 334 applied to the first elevator clamp 114 and the second elevator clamp 124 drives actuation of the first elevator 314 and the second elevator 324 against the elevator actuator 350.

As illustrated in FIGS. 1, 6, and 11A-13, in one or more examples of the system 100, the elevator test apparatus 104 includes a first lever arm 146 and a second lever arm 148. The first lever arm 146 is coupled to the first elevator clamp 114. The second lever arm 148 is coupled to the second elevator clamp 124. With the first elevator clamp 114 coupled to the first elevator 314 and the second elevator clamp 124 coupled to the second elevator 324, the constant elevator test force 334 applied to the first lever arm 146 and the second lever arm 148 drives actuation of the first elevator 314 and the second elevator 324 against the elevator actuator 350.

As illustrated in FIGS. 1, 6, and 11A-13, in one or more examples of the system 100, each one of the first lever arm 146 and the second lever arm 148 include a forward end 156 and an aft end 158. The aft end 158 is spaced away from the forward end 156 along a longitudinal axis of the lever arm. With the first elevator clamp 114 coupled to the first elevator 314 and the second elevator clamp 124 coupled to the second elevator 324, the constant elevator test force 334 applied to the forward end 156 of the first lever arm 146 and the second lever arm 148 drives actuation of the first elevator 314 and the second elevator in the trailing edge up direction 366 (FIG. 12A) against the elevator actuator 350. With the first elevator clamp 114 coupled to the first elevator 314 and the second elevator clamp 124 coupled to the second elevator 324, the constant elevator test force 334 applied to the aft end 158 of the first lever arm 146 and the second lever arm 148 drives actuation of the first elevator 314 and the second elevator in the trailing edge down direction 368 (FIG. 12B) against the elevator actuator 350.

As illustrated in FIGS. 1, 6, and 11A-13, in one or more examples of the system 100, the forward end 156 of the first lever arm 146 is spaced away from the first elevator clamp 114. Similarly, in one or more examples, the forward end 156 of the second lever arm 148 is spaced away from the second elevator clamp 124. The relative positions of the end 156 and the aft end 158 of the lever arm 130 relative to the elevator clamp 134 can vary as needed to position the center of mass based on the geometry and configuration of the aerial refueling boom 300.

As illustrated in FIGS. 1, 6, and 11A-13, in one or more examples of the system 100, each one of the first elevator clamp 114 and the second elevator clamp 124 includes an upper jaw 182 and a lower jaw 184. The upper jaw 182 and the lower jaw 184 are movable relative to each other between an open position and a closed position. In one or more examples, the upper jaw 182 and the lower jaw 184 are hingedly coupled together and pivotable relative to each other. In one or more examples, the upper jaw 182 and the lower jaw 184 are configured to be fastened or otherwise secured together in the closed position around the elevator 304.

As illustrated in FIGS. 1, 6, and 11A-13, in one or more examples of the system 100, each one of the first elevator clamp 114 and the second elevator clamp 124 includes an upper liner 186 and a lower liner 188. The upper liner 186 is coupled to the upper jaw 182. The lower liner 188 is coupled to the lower jaw 184. The upper liner 186 and the lower liner 188 protect the aerodynamic surface of the elevator 304 when the elevator clamp 134 is coupled to the elevator 304.

As illustrated in FIGS. 1, 11A and 11B, in one or more examples, the system 100 includes a first mass 194. The first mass 194 is configured to be coupled to (e.g., suspended from) the first elevator clamp 114, such as to one of the forward end 156 or the aft end 158 of the first lever arm 146. In one or more examples, the system 100 also includes a second mass 196. The second mass 196 is configured to be coupled to (e.g., suspended from) the second elevator clamp 124, such as to one of the forward end 156 or the aft end 158 of the second lever arm 148. With the first mass 194 coupled to the first elevator clamp 114 and the second mass 196 coupled to the second elevator clamp 124, the first mass 194 and the second mass 196 generate the constant elevator test force 334.

As illustrated in FIGS. 1, 11A and 11B, in one or more examples of the system 100, the mobile platform 198 is configured to support and selectively release the first mass 194 and the second mass 196. In one or more examples, with the first mass 194 coupled to (e.g., suspended from) the first rudder clamp 112, such as the first lever arm 146, and the second mass 196 coupled to (e.g., suspended from) the second rudder clamp 122, such as the second lever arm 148, and the first elevator 314 and the second elevator 324 in the start position, the first mass 194 and the second mass 196 are supported by the mobile platform 198. The mobile platform 198 releases the first mass 194 and the second mass 196, such that the first mass 194 and the second mass 196 generate the constant elevator test force 334 and move the elevator 304 to the end position.

As illustrated in FIGS. 1 and 5-13, in one or more examples of the system 100, the crank support 106 is configured to be coupled to the body 306 of the aerial refueling boom 300. The crank 110 is coupled to and pivotable relative to the crank support 106. The first rudder clamp 112 is coupled to the crank 110 and is configured to be coupled to the first rudder 312 of the aerial refueling boom 300. The second rudder clamp 122 is coupled to the crank 110 and is configured to be coupled to the second rudder 322 of the aerial refueling boom 300. The first elevator clamp 114 is configured to be coupled to the first elevator 314 of the aerial refueling boom 300. The second elevator clamp 124 is configured to be coupled to the second elevator 324 of the aerial refueling boom 300. With the first rudder clamp 112 coupled to the first rudder 312, the constant rudder test force 332 applied to the crank 110 drives actuation of the first rudder 312 against a first rudder actuator 342. With the second rudder clamp 122 coupled to the second rudder 322, the constant rudder test force 332 applied to the crank 110 drives actuation of the second rudder 322 against the second rudder actuator 344. With the first elevator clamp 114 coupled to the first elevator 314 and the second elevator clamp 124 coupled to the second elevator 324, the constant elevator test force 334 applied to the first elevator clamp 114 and the second elevator clamp 124 drives actuation of the first elevator 314 and the second elevator 324 against the elevator actuator 350.

Referring now to FIGS. 1, 5 and 7A-10B, by way of examples, present disclosure is also directed to the rudder test apparatus 102. The following are examples of the rudder test apparatus 102, according to the present disclosure. In one or more examples, the rudder test apparatus 102 is an implementation of or forms a portion of the system 100 (FIG. 1). Examples of the rudder test apparatus 102 include a number of elements, steps, operations, or processes. Not all of the elements, steps, operations, or processes described or illustrated in one example are required in that example. Some or all of the elements, steps, operations, or processes described or illustrated in one example can be combined with other examples in various ways without the need to include other elements, steps, operations, or processes described in those other examples, even though such combination or combinations are not explicitly described or illustrated by example herein.

In one or more examples, the rudder test apparatus 102 includes a combination of the saddle 108, the crank support 106, the crank 110, at least one of the first rudder clamp 112 and the second rudder clamp 122, at least one of the first rod 142 and the second rod 144. The saddle 108 is configured to be coupled to the body 306 of the aerial refueling boom 300. The crank support 106 is coupled to the saddle 108. The crank 110 is coupled to the crank support 106 and is configured to pivot relative to the crank support 106. The first rudder clamp 112 is coupled to the crank 110 and is configured to be coupled to the first rudder 312 of the aerial refueling boom 300. The second rudder clamp 122 is coupled to the crank 110 and is configured to be coupled to a second rudder 322 of the aerial refueling boom 300. With the first rudder clamp 112 coupled to the first rudder 312, the constant rudder test force 332 applied to the crank 110 drives actuation of the first rudder 312 against the first rudder actuator 342. With the second rudder clamp 122 coupled to the second rudder 322, the constant rudder test force 332 applied to the crank 110 drives actuation of the second rudder 322 against a second rudder actuator 344. The first rod 142 extends between and couples the crank 110 and the first rudder clamp 112. The second rod 144 extends between and couples the crank 110 and the second rudder clamp 122.

In one or more examples of the rudder test apparatus 102, the crank 110 includes a combination of the first crank arm 152, the second crank arm 154, the first drive arm 162 and the second drive arm 164. In one or more examples, the second crank arm 154 is at least approximately parallel to the first crank arm 152. The first drive arm 162 is oriented at an acute angle relative to the first crank arm 152 and an obtuse angle relative to the second crank arm 154. The second drive arm 164 is oriented at an obtuse angle relative to the first crank arm 152 and an acute angle relative to the second crank arm 154. With the first rudder clamp 112 coupled to the first rudder 312 and the first drive arm 162, the constant rudder test force 332 applied to the first crank arm 152 drives actuation of the first rudder 312 in the inboard direction 362 against the first rudder actuator 342. With the first rudder clamp 112 coupled to the first rudder 312 and the first drive arm 162, the constant rudder test force 332 applied to the second crank arm 154 drives actuation of the first rudder 312 in an outboard direction 364 against the first rudder actuator 342. With the second rudder clamp 122 coupled to the second rudder 322 and the second drive arm 164, the constant rudder test force 332 applied to the second crank arm 154 drives actuation of the second rudder 322 in the inboard direction 362 against the second rudder actuator 344. With the second rudder clamp 122 coupled to the second rudder 322 and the second drive arm 164, the constant rudder test force 332 applied to the first crank arm 152 drives actuation of the second rudder 322 in an outboard direction 364 against the second rudder actuator 344.

In one or more examples, the rudder test apparatus 102 also includes the first elevator clamp 114 and the second elevator clamp 124. In these examples, the first elevator clamp 114 is coupled to the crank support 106 and is configured to be coupled to the first elevator 314 to inhibit motion of the first elevator 314. The second elevator clamp 124 is coupled to the crank support 106 and is configured to be coupled to the second elevator 324 to inhibit motion of the second elevator 324.

Referring now to FIGS. 1, 6 and 11A-13, by way of examples, the present disclosure is additionally directed to the elevator test apparatus 104. The following are examples of the elevator test apparatus 104, according to the present disclosure. Examples of the elevator test apparatus 104 include a number of elements, features, and components. In one or more examples, the elevator test apparatus 104 is an implementation of or forms a portion of the system 100 (FIG. 1). Not all of the elements, features, and/or components described or illustrated in one example are required in that example. Some or all of the elements, features, and/or components described or illustrated in one example can be combined with other examples in various ways without the need to include other elements, features, and/or components described in those other examples, even though such combination or combinations are not explicitly described or illustrated by example herein.

In one or more examples, the elevator test apparatus 104 includes a combination of the first elevator clamp 114, the second elevator clamp 124, the first lever arm 146, and the second lever arm 148. The first elevator clamp 114 is configured to be coupled to the first elevator 314 of the aerial refueling boom 300. The second elevator clamp 124 is configured to be coupled to the second elevator 324 of the aerial refueling boom 300. With the first elevator clamp 114 coupled to the first elevator 314 and the second elevator clamp 124 coupled to the second elevator 324, the constant elevator test force 334 applied to the first elevator clamp 114 and the second elevator clamp 124 drives actuation of the first elevator 314 and the second elevator 324 against an elevator actuator 350. The first lever arm 146 is coupled to the first elevator clamp 114. The second lever arm 148 is coupled to the second elevator clamp 124. With the first elevator clamp 114 coupled to the first elevator 314 and the second elevator clamp 124 coupled to the second elevator 324, the constant elevator test force 334 applied to the first lever arm 146 and the second lever arm 148 drives actuation of the first elevator 314 and the second elevator 324 against the elevator actuator 350.

In one or more examples of the elevator test apparatus 104, each one of the first lever arm 146 and the second lever arm 148 includes the forward end 156 and the aft end 158 spaced away from the forward end 156. With the first elevator clamp 114 coupled to the first elevator 314 and the second elevator clamp 124 coupled to the second elevator 324, the constant elevator test force 334 applied to the forward end 156 of the first lever arm 146 and the second lever arm 148 drives actuation of the first elevator 314 and the second elevator in the trailing edge up direction 366 against the elevator actuator 350. With the first elevator clamp 114 coupled to the first elevator 314 and the second elevator clamp 124 coupled to the second elevator 324, the constant elevator test force 334 applied to the aft end 158 of the first lever arm 146 and the second lever arm 148 drives actuation of the first elevator 314 and the second elevator in the trailing edge down direction 368 against the elevator actuator 350. In one or more examples, the forward end 156 of the first lever arm 146 is spaced away from the first elevator clamp 114 and the forward end 156 of the second lever arm 148 is spaced away from the second elevator clamp 124.

Referring now to FIG. 2, by way of examples, present disclosure is also directed to a method 1000 for testing control surface actuators 308 of the aerial refueling boom 300, also referred to herein as a control surface actuator testing method. The following are examples of the method 1000, according to the present disclosure. In one or more examples, the method 1000 is implemented using the system 100, the rudder test apparatus 102, and/or the elevator test apparatus 104 (FIGS. 1 and 5-13). Examples of the method 1000 include a number of elements, steps, operations, or processes. Not all of the elements, steps, operations, or processes described or illustrated in one example are required in that example. Some or all of the elements, steps, operations, or processes described or illustrated in one example can be combined with other examples in various ways without the need to include other elements, steps, operations, or processes described in those other examples, even though such combination or combinations are not explicitly described or illustrated by example herein.

In one or more examples, the method 1000 includes a step or method of testing 2000 the rudder actuator 340 of the aerial refueling boom 300. In one or more examples, the method 1000 includes a step or method of testing 3000 the elevator actuator 350 of the aerial refueling boom 300.

In one or more examples, the method 1000, such as a step of testing 2000, includes a step of coupling 2100 the rudder test apparatus 102 to at least one of the first rudder 312 and the second rudder 322 of the aerial refueling boom 300. In one or more examples, the method 1000, such as the step of testing 2000, includes a step of applying 2200 the constant rudder test force 332 to the rudder test apparatus 102. In one or more examples, the method 1000, such as the step of testing 2000, includes a step of driving 2300 actuation of one of the first rudder 312 or the second rudder 322 against the rudder actuator 340. In one or more examples, the method 1000, such as the step of testing 2000, includes a step of measuring 2400 the rudder actuation time interval. In one or more examples, the method 1000, such as the step of testing 2000, includes a step of comparing 2500 the rudder actuation time interval to a rudder actuator failure threshold. The method 1000 includes a step of passing the rudder actuator 340 when the rudder actuation time interval is greater (e.g., slower) than the rudder actuator failure threshold or failing the rudder actuator 340 when the rudder actuation time interval is less (e.g., faster) than the rudder actuator failure threshold.

In one or more examples, the method 1000, such as the step of testing 3000, includes a step of coupling 3100 the elevator test apparatus 104 to at least one of the first elevator 314 and the second elevator 324 of the aerial refueling boom 300. In one or more examples, the method 1000, such as the step of testing 3000, includes a step of applying 3200 the constant elevator test force 334 to the elevator test apparatus 104. In one or more examples, the method 1000, such as the step of testing 3000, includes a step of driving 3300 actuation of the first elevator 314 and the second elevator 324 against the elevator actuator 350. In one or more examples, the method 1000, such as the step of testing 3000, includes a step of measuring 3400 the elevator actuation time interval. In one or more examples, the method 1000, such as the step of testing 3000, includes a step of comparing 3500 the elevator actuation time interval to an elevator actuator failure threshold. The method 1000 includes a step of passing the elevator actuator 350 when the elevator actuation time interval is greater (e.g., slower) than the elevator actuator failure threshold or failing the elevator actuator 350 when the elevator actuation time interval is less (e.g., faster) than the elevator actuator failure threshold.

In one or more examples, the test force (e.g., constant rudder test force 332 and constant elevator test force 334) is a load equivalent criterion, which is established based on a conventional bench test pass and fail criteria for a 1000-hour damping health test for the control surface actuators. The pass/fail criteria of conventional bench testing of control surface actuators are based on flutter suppression requirements based on the actuator load versus actuator stroke rate. In one or more examples, the method 1000 includes a step of determining a change in the actuator hydraulic model parameters (e.g., orifice area, coefficient of discharge, etc.) that yields a stroke rate that substantially matches the conventional bench test failure limit. The method 1000 includes a step of modelling that determined change in a correlated deployment simulation. The method 1000 includes a step of determining (e.g., computing) the time required for full stroke at the specific test force. As such, the testing criteria is expressed in terms of stroke time (e.g., rudder actuation time interval and elevator actuation time interval). The rudder test apparatus 102 and the elevator test apparatus 104 of the system 100 are designed to replicate applying the load to the control surface actuators 308 and testing the stroke time of each of the control surface actuators 308 in both directions (e.g., extension and retraction). The system 100 is installed on the control surfaces 310 (e.g., rudders 302 and elevators 304) and the force (e.g., mass) is applied at predetermined loads for the rudders 302 and the elevators 304. As such, the control surfaces 310 are rotated up and down (e.g., elevators 304) and/or inboard and outboard (e.g., rudders 302) to cause extension and retraction of the control surface actuators 308. The extension and retractions are timed (e.g., actuation time interval) and must exceed the failure criteria time (e.g., actuator failure threshold).

Figures 14, 15:
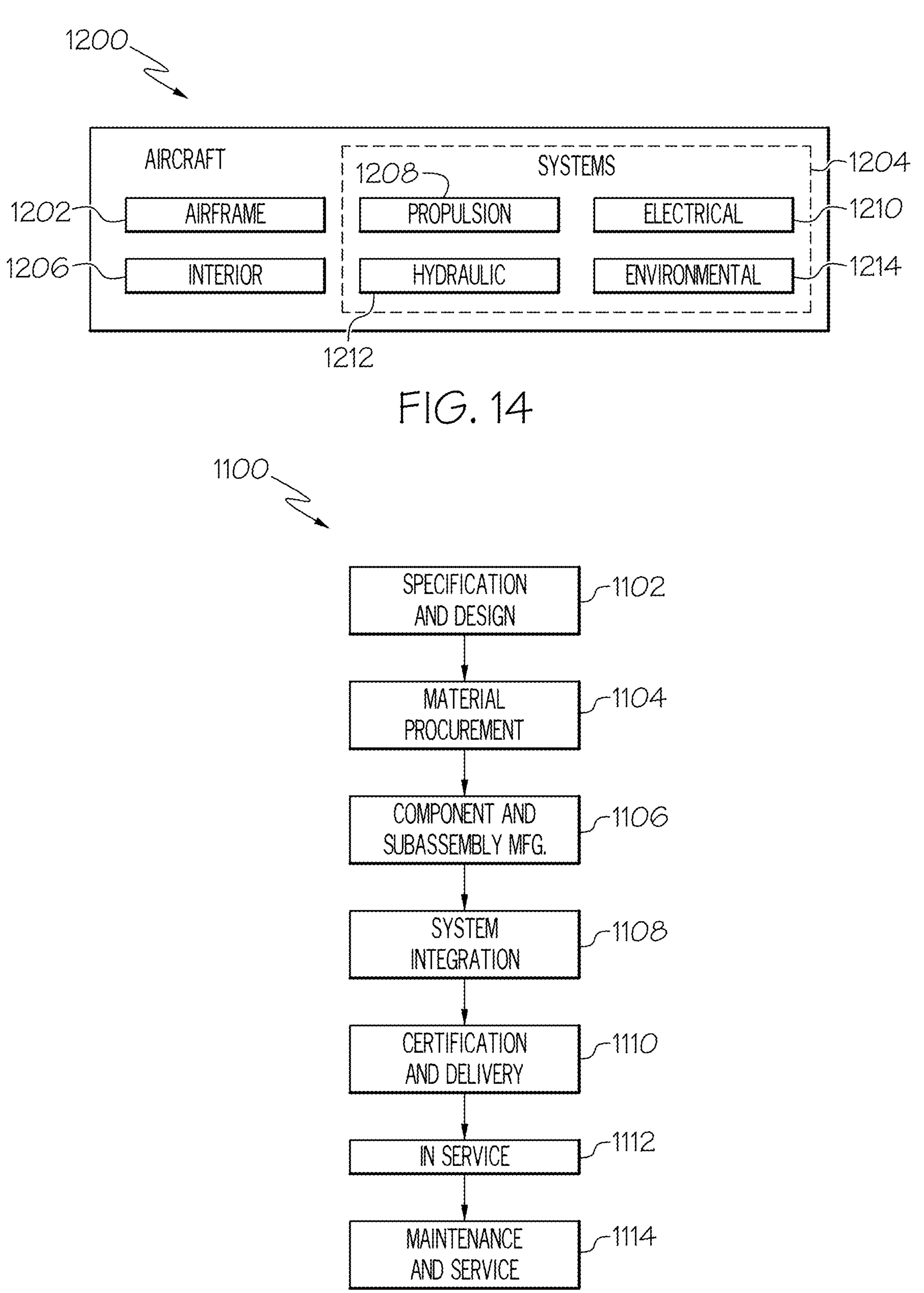
FIG. 14 is a schematic block diagram of an example of an aircraft.
FIG. 15 is a flow diagram of an example of an aircraft manufacturing and service method.

Referring now to FIGS. 14 and 15, examples of the system 100, the rudder test apparatus 102, the elevator test apparatus 104, and the method 1000, described herein, may be related to, or used in the context of, an aircraft 1200, as schematically illustrated in FIG. 14, and/or an aerospace manufacturing and service method 1100, as shown in the flow diagram of FIG. 15. As an example, the aircraft 1200 and/or the manufacturing and service method 1100 may utilize the system 100 and/or the method 1000 to test control surface actuators 308 of the aerial refueling boom 300.

Referring to FIG. 14, which illustrates an example of the aircraft 1200. The aircraft 1200 can be any aerospace vehicle or platform. In one or more examples, the aircraft 1200 includes the airframe 1202 having the interior 1206. The aircraft 1200 includes a plurality of onboard systems 1204 (e.g., high-level systems). Examples of the onboard systems 1204 of the aircraft 1200 include propulsion systems 1208, hydraulic systems 1212, electrical systems 1210, and environmental systems 1214. In other examples, the onboard systems 1204 also includes one or more control systems coupled to the airframe 1202 of the aircraft 1200. In yet other examples, the onboard systems 1204 also include one or more other systems, such as, but not limited to, communications systems, avionics systems, software distribution systems, network communications systems, passenger information/entertainment systems, guidance systems, radar systems, weapons systems, and the like. In these examples, the aircraft 1200 is an aerial refueling aircraft that includes the aerial refueling boom 300 that is tested using the system 100 and/or according to the method 1000.

Referring to FIG. 15, during pre-production of the aircraft 1200, the manufacturing and service method 1100 includes specification and design 1102 of the aircraft 1200 and material procurement 1104. During production of the aircraft 1200, component and subassembly manufacturing 1106 and system integration 1108 of the aircraft 1200 take place. Thereafter, the aircraft 1200 goes through certification and delivery 1110 to be placed in service 1112. Routine maintenance and service 1114 includes modification, reconfiguration, refurbishment, etc. of one or more systems of the aircraft 1200.

Each of the processes of the manufacturing and service method 1100 illustrated in FIG. 15 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

Examples of the system 100, the rudder test apparatus 102, the elevator test apparatus 104, and the method 1000, shown and described herein, may be employed during any one or more of the stages of the manufacturing and service method 1100 shown in the flow diagram illustrated by FIG. 15. In an example, the aerial refueling boom 300 can be tested using the system 100 and/or according to the method 1000 during a portion of component and subassembly manufacturing 1106 and/or system integration 1108. Further, the aerial refueling boom 300 can be tested using the system 100 and/or according to the method 1000 while the aircraft 1200 is in service 1112. Also, the aerial refueling boom 300 can be tested using the system 100 and/or according to the method 1000 during system integration 1108 and certification and delivery 1110. Similarly, the aerial refueling boom 300 can be tested using the system 100 and/or according to the method 1000 during maintenance and service 1114.

The preceding detailed description refers to the accompanying drawings, which illustrate specific examples described by the present disclosure. Other examples having different structures and operations do not depart from the scope of the present disclosure. Like reference numerals may refer to the same feature, element, or component in the different drawings. Throughout the present disclosure, any one of a plurality of items may be referred to individually as the item and a plurality of items may be referred to collectively as the items and may be referred to with like reference numerals. Moreover, as used herein, a feature, element, component, or step preceded with the word "a" or "an" should be understood as not excluding a plurality of features, elements, components, or steps, unless such exclusion is explicitly recited.

Illustrative, non-exhaustive examples, which may be, but are not necessarily, claimed, of the subject matter according to the present disclosure are provided above. Reference herein to "example" means that one or more feature, structure, element, component, characteristic, and/or operational step described in connection with the example is included in at least one aspect, embodiment, and/or implementation of the subject matter according to the present disclosure. Thus, the phrases "an example," "another example," "one or more examples," and similar language throughout the present disclosure may, but do not necessarily, refer to the same example. Further, the subject matter characterizing any one example may, but does not necessarily, include the subject matter characterizing any other example. Moreover, the subject matter characterizing any one example may be, but is not necessarily, combined with the subject matter characterizing any other example.

As used herein, a system, apparatus, device, structure, article, element, component, or hardware "configured to" perform a specified function is indeed capable of performing the specified function without any alteration, rather than merely having potential to perform the specified function after further modification. In other words, the system, apparatus, device, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, device, structure, article, element, component, or hardware described as being "configured to" perform a particular function may additionally or alternatively be described as being "adapted to" and/or as being "operative to" perform that function.

Unless otherwise indicated, the terms "first," "second," "third," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, the phrase "at least one of," when used with a list of items, means different combinations of one or more of the listed items may be used and only one of each item in the list may be needed. For example, "at least one of item A, item B, and item C" may include, without limitation, item A or item A and item B. This example also may include item A, item B, and item C, or item B and item C. In other examples, "at least one of" may be, for example, without limitation, two of item A, one of item B, and ten of item C; four of item B and seven of item C; and other suitable combinations. As used herein, the term "and/or" and the "/" symbol includes any and all combinations of one or more of the associated listed items.

For the purpose of this disclosure, the terms "coupled," "coupling," and similar terms refer to two or more elements that are joined, linked, fastened, attached, connected, put in communication, or otherwise associated (e.g., mechanically, electrically, fluidly, optically, electromagnetically) with one another. In various examples, the elements may be associated directly or indirectly. As an example, element A may be directly associated with element B. As another example, element A may be indirectly associated with element B, for example, via another element C. It will be understood that not all associations among the various disclosed elements are necessarily represented. Accordingly, couplings other than those depicted in the figures may also exist.

As used herein, the term "approximately" refers to or represents a condition that is close to, but not exactly, the stated condition that still performs the desired function or achieves the desired result. As an example, the term "approximately" refers to a condition that is within an acceptable predetermined tolerance or accuracy, such as to a condition that is within 10% of the stated condition. However, the term "approximately" does not exclude a condition that is exactly the stated condition. As used herein, the term "substantially" refers to a condition that is essentially the stated condition that performs the desired function or achieves the desired result.

FIGS. 1 and 3-14, referred to above, may represent functional elements, features, or components thereof and do not necessarily imply any particular structure. Accordingly, modifications, additions and/or omissions may be made to the illustrated structure. Additionally, those skilled in the art will appreciate that not all elements, features, and/or components described and illustrated in FIGS. 1 and 3-14, referred to above, need be included in every example and not all elements, features, and/or components described herein are necessarily depicted in each illustrative example. Accordingly, some of the elements, features, and/or components described and illustrated in FIGS. 1 and 3-14 may be combined in various ways without the need to include other features described and illustrated in FIGS. 1 and 3-14, other drawing figures, and/or the accompanying disclosure, even though such combination or combinations are not explicitly illustrated herein. Similarly, additional features not limited to the examples presented, may be combined with some or all of the features shown and described herein. Unless otherwise explicitly stated, the schematic illustrations of the examples depicted in FIGS. 1 and 3-14, referred to above, are not meant to imply structural limitations with respect to the illustrative example. Rather, although one illustrative structure is indicated, it is to be understood that the structure may be modified when appropriate. Accordingly, modifications, additions and/or omissions may be made to the illustrated structure. Furthermore, elements, features, and/or components that serve a similar, or at least substantially similar, purpose are labeled with like numbers in each of FIGS. 1 and 3-14, and such elements, features, and/or components may not be discussed in detail herein with reference to each of FIGS. 1 and 3-14. Similarly, all elements, features, and/or components may not be labeled in each of FIGS. 1 and 3-14, but reference numerals associated therewith may be utilized herein for consistency.

In FIGS. 2 and 15, referred to above, the blocks may represent operations, steps, and/or portions thereof and lines connecting the various blocks do not imply any particular order or dependency of the operations or portions thereof. It will be understood that not all dependencies among the various disclosed operations are necessarily represented. FIGS. 2 and 15 and the accompanying disclosure describing the operations of the disclosed methods set forth herein should not be interpreted as necessarily determining a sequence in which the operations are to be performed. Rather, although one illustrative order is indicated, it is to be understood that the sequence of the operations may be modified when appropriate. Accordingly, modifications, additions and/or omissions may be made to the operations illustrated and certain operations may be performed in a different order or simultaneously. Additionally, those skilled in the art will appreciate that not all the operations described need be performed.

Further, references throughout the present specification to features, advantages, or similar language used herein do not imply that all of the features and advantages that may be realized with the examples disclosed herein should be, or are in, any single example. Rather, language referring to the features and advantages is understood to mean that a specific feature, advantage, or characteristic described in connection with an example is included in at least one example. Thus, discussion of features, advantages, and similar language used throughout the present disclosure may, but does not necessarily, refer to the same example.

The described features, advantages, and characteristics of one example may be combined in any suitable manner in one or more other examples. One skilled in the relevant art will recognize that the examples described herein may be practiced without one or more of the specific features or advantages of a particular example. In other instances, additional features and advantages may be recognized in certain examples that may not be present in all examples. Furthermore, although various examples of the system 100, the rudder test apparatus 102, the elevator test apparatus 104, the method 1000, the method 2000, and the method 3000 have been shown and described, modifications may occur to those skilled in the art upon reading the specification. The present application includes such modifications and is limited only by the scope of the claims.

What is claimed is:

1. A system for testing control surface actuators of an aerial refueling boom, the system comprising:

a rudder test apparatus configured to be coupled to at least one of a first rudder and a second rudder of the aerial refueling boom; and an elevator test apparatus configured to be coupled to at least one of a first elevator and a second elevator of the aerial refueling boom, wherein:

with the rudder test apparatus coupled to at least one of the first rudder and the second rudder, a constant rudder test force applied to the rudder test apparatus drives actuation of one of the first rudder or the second rudder against a rudder actuator; and with the elevator test apparatus coupled to at least one of the first elevator and the second elevator, a constant elevator test force applied to the elevator test apparatus drives actuation of the first elevator and the second elevator against an elevator actuator.

2. The system of claim 1, wherein:

the rudder test apparatus comprises:

a crank support configured to be coupled to a body of the aerial refueling boom;

a crank coupled to and pivotable relative to the crank support;

a first rudder clamp coupled to the crank and configured to be coupled to the first rudder; and a second rudder clamp coupled to the crank and configured to be coupled to the second rudder;

with the first rudder clamp coupled to the first rudder, the constant rudder test force applied to the crank drives actuation of the first rudder against a first rudder actuator; and with the second rudder clamp coupled to the second rudder, the constant rudder test force applied to the crank drives actuation of the second rudder against a second rudder actuator.

3. The system of claim 2, wherein:

the rudder test apparatus further comprises a saddle configured to receive a portion of the body of the aerial refueling boom; and the crank support is coupled to the saddle.

4. The system of claim 2, wherein the rudder test apparatus further comprises:

a first rod extending between and coupling the crank and the first rudder clamp; and a second rod extending between and coupling the crank and the second rudder clamp.

5. The system of claim 2, wherein:

the crank comprises:

a first crank arm; and a first drive arm oriented at an acute angle relative to the first crank arm; and with the first rudder clamp coupled to the first rudder and the first drive arm, the constant rudder test force applied to the first crank arm drives actuation of the first rudder in an inboard direction against a first rudder actuator.

6. The system of claim 5, wherein:

the crank further comprises a second crank arm parallel to the first crank arm;

the first drive arm is oriented at an obtuse angle relative to the second crank arm; and with the first rudder clamp coupled to the first rudder and the first drive arm, the constant rudder test force applied to the second crank arm drives actuation of the first rudder in an outboard direction against the first rudder actuator.

7. The system of claim 6, wherein:

the crank further comprises a second drive arm oriented at an acute angle relative to the second crank arm; and with the second rudder clamp coupled to the second rudder and the second drive arm, the constant rudder test force applied to the second crank arm drives actuation of the second rudder in the inboard direction against the second rudder actuator.

8. The system of claim 7, wherein:

the second drive arm oriented at an obtuse angle relative to the first crank arm; and with the second rudder clamp coupled to the second rudder and the second drive arm, the constant rudder test force applied to the first crank arm drives actuation of the second rudder in an outboard direction against the second rudder actuator.

9. The system of claim 2, wherein each one of the first rudder clamp and the second rudder clamp comprises:

an inboard jaw; and an outboard jaw, an inboard liner coupled to the inboard jaw; and an outboard liner coupled to the outboard jaw.

10. The system of claim 2, wherein the rudder test apparatus further comprises:

a first elevator clamp coupled to the crank support and configured to be coupled to the first elevator to inhibit motion of the first elevator; and a second elevator clamp coupled to the crank support and configured to be coupled to the second elevator to inhibit motion of the second elevator.

11. The system of claim 2, further comprising a mass configured to be coupled to the crank, wherein, with the mass coupled to the crank, the mass generates the constant rudder test force.

12. The system of claim 1, wherein:

the elevator test apparatus comprises:

a first elevator clamp configured to be coupled to the first elevator; and a second elevator clamp configured to be coupled to the second elevator; and with the first elevator clamp coupled to the first elevator and the second elevator clamp coupled to the second elevator, the constant elevator test force applied to the first elevator clamp and the second elevator clamp drives actuation of the first elevator and the second elevator against the elevator actuator.

13. The system of claim 12, wherein:

the elevator test apparatus further comprises:

a first lever arm coupled to the first elevator clamp; and a second lever arm coupled to the second elevator clamp; and with the first elevator clamp coupled to the first elevator and the second elevator clamp coupled to the second elevator, the constant elevator test force applied to the first lever arm and the second lever arm drives actuation of the first elevator and the second elevator against the elevator actuator.

14. The system of claim 13, wherein:

each one of the first lever arm and the second lever arm comprises:

a forward end; and an aft end spaced away from the forward end; and with the first elevator clamp coupled to the first elevator and the second elevator clamp coupled to the second elevator:

the constant elevator test force applied to the forward end of the first lever arm and the second lever arm drives actuation of the first elevator and the second elevator in a trailing edge up direction against the elevator actuator; and the constant elevator test force applied to the aft end of the first lever arm and the second lever arm drives actuation of the first elevator and the second elevator in a trailing edge down direction against the elevator actuator.

15. The system of claim 14, wherein:

the forward end of the first lever arm is spaced away from the first elevator clamp; and the forward end of the second lever arm is spaced away from the second elevator clamp.

16. The system of claim 12, wherein each one of the first elevator clamp and the second elevator clamp comprises:

an upper jaw;

a lower jaw, an upper liner coupled to the upper jaw; and a lower liner coupled to the lower jaw.

17. The system of claim 12, further comprising:

a first mass configured to be coupled to the first elevator clamp; and a second mass configured to be coupled to the second elevator clamp, wherein, with the first mass coupled to the first elevator clamp and the second mass coupled to the second elevator clamp, the first mass and the second mass generate the constant elevator test force.

18. A system for testing control surface actuators of an aerial refueling boom, the system comprising:

a crank support configured to be coupled to a body of the aerial refueling boom;

a crank coupled to and pivotable relative to the crank support;

a first rudder clamp coupled to the crank and configured to be coupled to a first rudder of the aerial refueling boom;

a second rudder clamp coupled to the crank and configured to be coupled to a second rudder of the aerial refueling boom;

a first elevator clamp configured to be coupled to a first elevator of the aerial refueling boom; and a second elevator clamp configured to be coupled to a second elevator of the aerial refueling boom, wherein:

with the first rudder clamp coupled to the first rudder, a constant rudder test force applied to the crank drives actuation of the first rudder against a first rudder actuator;

with the second rudder clamp coupled to the second rudder, the constant rudder test force applied to the crank drives actuation of the second rudder against a second rudder actuator; and with the first elevator clamp coupled to the first elevator and the second elevator clamp coupled to the second elevator, a constant elevator test force applied to the first elevator clamp and the second elevator clamp drives actuation of the first elevator and the second elevator against an elevator actuator.

19. A method for testing control surface actuators of an aerial refueling boom, the method comprising:

coupling a rudder test apparatus to at least one of a first rudder and a second rudder of the aerial refueling boom;

coupling an elevator test apparatus to at least one of a first elevator and a second elevator of the aerial refueling boom;

applying a constant rudder test force to the rudder test apparatus;

driving actuation of one of the first rudder or the second rudder against a rudder actuator;

applying a constant elevator test force to the elevator test apparatus; and driving actuation of the first elevator and the second elevator against an elevator actuator.

20. The method of claim 19, further comprising:

measuring a rudder actuation time interval;

comparing the rudder actuation time interval to a rudder actuator failure threshold;

measuring an elevator actuation time interval; and comparing the elevator actuation time interval to an elevator actuator failure threshold.

* * * * *